United States Patent
Hansen et al.

(10) Patent No.: US 9,555,333 B2
(45) Date of Patent: Jan. 31, 2017

(54) VIDEO GAMES INCLUDING REAL-LIFE ATTRIBUTES AND/OR FANTASY SETTINGS

(71) Applicants: Andrew S Hansen, Bountiful, UT (US); David A Jones, Salt Lake City, UT (US)

(72) Inventors: Andrew S Hansen, Bountiful, UT (US); David A Jones, Salt Lake City, UT (US)

(73) Assignee: VOODOO GAMING LLC, Bountiful, UT (US)

( * ) Notice: Subject to any disclaimer, the term of this patent is extended or adjusted under 35 U.S.C. 154(b) by 0 days.

(21) Appl. No.: 14/744,011

(22) Filed: Jun. 18, 2015

(65) Prior Publication Data

US 2015/0283467 A1 Oct. 8, 2015

Related U.S. Application Data

(62) Division of application No. 11/956,288, filed on Dec. 13, 2007.

(Continued)

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/65* | (2014.01) |
| *A63F 13/30* | (2014.01) |
| *A63F 13/23* | (2014.01) |

(Continued)

(52) U.S. Cl.
CPC ............... *A63F 13/65* (2014.09); *A63F 13/12* (2013.01); *A63F 13/23* (2014.09); *A63F 13/5375* (2014.09); *A63F 13/795* (2014.09); *A63F 13/828* (2014.09); *A63F 13/61* (2014.09); *A63F 2300/69* (2013.01)

(58) Field of Classification Search
CPC ........ A63F 13/60; A63F 13/65; A63F 13/655; A63F 13/69
See application file for complete search history.

(56) References Cited

U.S. PATENT DOCUMENTS

| | | | |
|---|---|---|---|
| 7,351,150 B2 * | 4/2008 | Sanchez | A63F 13/12 463/40 |
| 7,945,503 B2 * | 5/2011 | Gottlieb | G06Q 30/0601 705/37 |

(Continued)

OTHER PUBLICATIONS

GameFAQ's Madden NFL 2007 (PS2) Strategy Guide, Oct. 30, 2006, <http://www.gamefaqs.com/ps2/932190-madden-nfl-07/faqs/44582>.*

*Primary Examiner* — Milap Shah
*Assistant Examiner* — Jason Pinheiro

(57) ABSTRACT

A video gaming system and related network interfaces with an online fantasy sports game. The video game play is enhanced using various features of a fantasy sports game. Similarly, the fantasy sports game can be enhanced using various features of the video game play. In one aspect of the invention the video game system acquires a team roster of the fantasy sport game and the team roster is used to define the sports video game team. The sports video game also acquires sports video game parameters that are associated with real-life attributes of video game team members that are associated with the real-life team members. The video game play changes frequently over a sports season due to the changing video game parameters and fantasy sports settings being used to define video game play.

22 Claims, 13 Drawing Sheets

Related U.S. Application Data

(60) Provisional application No. 60/869,831, filed on Dec. 13, 2006.

(51) Int. Cl.
*A63F 13/5375* (2014.01)
*A63F 13/795* (2014.01)
*A63F 13/828* (2014.01)
*A63F 13/61* (2014.01)

(56) References Cited

U.S. PATENT DOCUMENTS

| | | | | |
|---|---|---|---|---|
| 2004/0266535 | A1* | 12/2004 | Reeves | A63F 13/12 463/42 |
| 2008/0026804 | A1* | 1/2008 | Baray | A63F 13/12 463/9 |

* cited by examiner

Figure 1

Fantasy Team Page

Fantasy League: Da Boyz

| League Home | Live scoring | Standings | Transaction Report |

Team: Gabriel
Week: 14

| Add/Drop | Find Free Agent | Trade | Top Lineup |

| PLAYER | OPP | WEATHER | BYE | AVE. | PREDICT | STATUS |
|---|---|---|---|---|---|---|
| Romo, T QB Dal | Det | Dome Sun/pm | 8 | 25.9 | 24.4 | Active |
| Alexander, S RB Sea | ARI | Rain | 8 | 8.0 | 9.1 | Active |
| James, E RB ARI | Sea | Rain | 8 | 10.8 | 10.8 | Active |
| Crayton,P WR Dal | Det | Dome | 8 | 8.0 | 6.8 | Active |
| Galloway, J WR TB | Hon | Sunny | 10 | 10.0 | 9.5 | Active |
| Smith, S WR Car | Jac | Snowy | 7 | 9.5 | 9.5 | Active |
| Gonzalez, T TE KC | Den | Windy | 8 | 8.8 | 8.6 | Active |
| Stover, M K Bal | Ind | Windy | 8 | 7.2 | 7.3 | Active |
| Rowens, Dst Bal | Ind | Windy | 8 | 11.0 | 11.6 | Active |
| Chatman, J RB Mia | Buf | Sunny | 9 | 4.4 | 2.7 | Reserve |
| Dayre, R RB Har | TB | Sunny | 10 | 8.1 | 4.7 | Reserve |
| Foster, D RB Car | Jac | Cloudy | 7 | 7.8 | 4.8 | Reserve |
| Cotchery, J WR NYJ | CLE | Sunny | 10 | 6.8 | 4.4 | Reserve |
| Lions, Dst Det | Dal | Dome | 6 | 12.2 | 11.6 | Reserve |

Figure 2

Preview Page

Gabriel at Jo Mama

|  | Gabriel | TOT= |  |  | Jo Mama | TOT= |
|---|---|---|---|---|---|---|
|  | Player | Prediction |  |  | Player | Prediction |
| QB | K. Warner | 12.0 |  | QB | T. Romo | 24.4 |
| RB | T. Henry | 10.0 |  | RB | S. Alexander | 9.1 |
| RB | R. Johnson | 7.0 |  | RB | E. James | 10.8 |
| WR | Howard | 9.0 |  | WR | C. Patrick | 6.8 |
| WR | D. Driver | 8.0 |  | WR | J. Galloway | 9.5 |
| WR | B. Engram | 8.0 |  | WR | S. Smith | 9.5 |
| TE | O. Daniels | 5.0 |  | TE | T. Gonzalez | 8.6 |
| K | L. Tynes | 7.0 |  | K | M. Stover | 7.3 |
| Dst | Colts | 13.0 |  | Dst | Ravens | 11.6 |

Reserves

| QB | Bulger |  | RB | R. Dayne |
|---|---|---|---|---|
| RB | A. Peterson |  | RB | D Foster |
| WR | D. Mason |  | RB | J. Chatman |
| WR | S. Moss |  | WR | J. Cotchery |
| D | Jaguars |  | Dst | Lions |

VIDEO GAMES INCLUDING REAL-LIFE ATTRIBUTES AND/OR FANTASY SETTINGS

RELATED APPLICATIONS

This application is a division of U.S. patent application Ser. No. 11/956,288 filed Dec. 13, 2007, which claims the benefit of and priority to U.S. Provisional Patent Application Ser. No. 60/869,831 filed Dec. 13, 2006, the contents of both patent applications are hereby incorporated by reference herein.

BACKGROUND

1. Field of the Invention

The present invention relates to video gaming systems and related networks, video gaming software, and online fantasy sports.

2. Related Technology

Fantasy sports leagues have become of increased popularity and are associated with virtually every sport played, not only in the United States, but also internationally. A fantasy sport (also known as rotisserie, roto, or fairy-tale sport; or owner simulation) is a game where fantasy owners build a fantasy team that competes against other fantasy teams managed by real-life fantasy team owners based on the statistics generated by individual real-life athletes, such as professional or collegiate athletes, or real-life teams of a real-life professional sport. Probably the most common variant converts statistical performance of real-life athletes into points that are compiled and totaled according to fantasy settings. Typically a fantasy team owner manages a fantasy roster listing real-life sport athletes selected, which are selected by the fantasy team owner in a fantasy draft. These point systems are typically simple enough to be manually calculated by a "league commissioner", but more commonly use computer accounting of real-life athlete statistics that occur in actual real-life professional or collegiate sports. In fantasy sports there is typically the ability for each fantasy team owner to trade, cut, and resign players, like a real-life sports team owner. In such fantasy leagues the fantasy owner is typically not an athlete or actual team manager, but rather, creates a fantasy team of real-life athletes and competes against the athlete selections of other fantasy team owners in the same fantasy league.

It is estimated by the Fantasy Sports Trade Association (FSTA) that 16 million adults in the U.S., age 18 to 55, play fantasy sports. Fantasy sports is also popular throughout the world with leagues for professional, regional, and collegiate football, basketball, baseball, hockey, golf, soccer, auto racing, wrestling, cricket, and other sports. Both professional and collegiate level sports have fantasy leagues associated thereto. Several examples of various fantasy formats are illustrated in Appendix A of U.S. Provisional Patent Application Ser. No. 60/869,831. As illustrated in the examples of Appendix A of the '831 provisional application, the rules of play may be customized, in some instances, by members of a league, such as a league manager.

An example of a football format is also illustrated by the following FSTA example:

How to Play Fantasy Football

When they devised the term "armchair quarterback" they certainly had the game of fantasy football in mind.

As the general manager, the fantasy football league owner assembles his team of stars and scrubs, making sure he has the right mix of passing, rushing and kicking. In some leagues, the fantasy general manager even has to assemble a defense. Then as the team's coach, the fantasy league owner has to pick the right starting lineup for that week's games, making sure that his best players aren't sitting on the bench. For anyone interested in starting a league, all you need are a few basic rules to get going. The beauty of fantasy football is that there really isn't any set guideline you MUST follow. It's your fantasy league, so fantasize any way you want. The main thing is to enjoy NFL games and enjoy them the best way you know how.

And that way is through a fantasy football league.

Okay, now let's take it step by step and get you started.

Step 1

Assemble a league of football owners who are willing to wheel and deal throughout the course of the NFL season. There is no set number, mind you, but 12 teams is great and 16 teams is better. You can certainly form leagues that are bigger and smaller than that, but make sure that you have an even-number of teams because each week you go head-to-head with another team.

Step 2

Elect a commissioner. The commissioner should be somebody who every team owner respects—you know, someone you'd let date your sister. The commissioner, who most likely also owns a team in the league, is responsible for the league constitution, bylaws and all final decisions.

Step 3

Setting the rules for your league is very important. There are many variations to the game and scoring systems for fantasy football are as different as the NFL and the CFL. Make sure all rules are set in stone before the draft is held. Some leagues give six points to any player who scores a touchdown, whether it be from rushing, passing or receiving. In that scenario, the quarterback and the wide receiver each get six points for a touchdown pass, making it ideal to have both Brett Favre and Antonio Freeman on your fantasy team. Other leagues give six points for a rushing touchdown and just three to the QB and three to the wide receiver on a touchdown pass. Some leagues also give bonus points for individual statistics, like three points for 100-yards rushing, 100-yards receiving or 300-yards passing. Bonus points can also be given for the length of a run, pass, catch or kick. The size of rosters also varies from league to league. Most leagues have rosters of 15 to 17 players: Three quarterbacks, four to five running backs, four to five wide receivers, two tight ends and two kickers. Most leagues start just seven players each week: One QB, two running backs, two wide receivers, one tight end and one kicker. The accumulative points of one team's starters are matched up against the points of another team and the end result is either a victory or a loss. There are no weighted statistics in fantasy football, just head-to-head records. Some leagues also use defense in their scoring system, drafting either one defensive player and starting him each week or drafting an entire defensive team and getting scoring from that team for any defensive touchdown or safety. Head coaches or teams can also be figured in the mix of things, with teams drafting one head coach and getting anywhere from one to three points for each victory that coach attains during the year.

Step 4

Have a draft. Players are usually acquired by using a draft, similar to what the NFL does. In the draft, team owners select any player they want and draft for 15-17 rounds to fill out their rosters. However, unlike the NFL, the draft is held in reverse order for the even-number rounds to make the league more balanced. For instance, in a 10-team league the draft order would be 1 through 10, with the 10th team having the first pick of the second round and going back up in reverse order. In that scenario, the first team to pick wouldn't select again until the 20th pick, but would then start the third round with the 21st selection. Some leagues also like to draft their players the same way they do in Rotisserie Baseball. With that in mind, players are acquired by using a bidding system where players are acquired for a dollar amount. Each team would have an imaginary $260 budget (or other fake cash figure) and players would be acquired by using that salary cap. In that scenario, Terrell Davis could go for $80.

Step 5

Set the schedule. League schedules are set up so that every team plays every other team at least once, and divisions are set up according to the league size. In leagues of 10 teams, only two divisions are needed and the top two teams in each division qualify for the playoffs. In leagues of 12 or more, three or four divisions are needed. Either way, the playoffs usually consist of the top four teams, with those teams meeting during Week 16 of the regular season. The Super Bowl is then held on the final week of the regular season—Week 17 this year—so that all of the NFL players are eligible for the fantasy football teams. Check out our schedule page in this issue for more help.

Step 6

Compile scores. Fantasy football is the one fantasy game in which you can actually count up your own scores; you wouldn't dare try that in baseball or basketball (or shouldn't, anyway). There are also several free services on the Internet that will run your league in exchange for the traffic your league will provide. Also, there are a number of software products that will help you run your league.

Step 7

Transactions. Teams can continue to trade throughout the season and teams can also pick up free agents anytime during the year. Leagues will need to form some type of setup so that the teams with the worst record get first shot at the free agents. Otherwise it's a first-come, first-serve basis. Some leagues have unlimited transactions, while others assign points for transactions, and you bid on free agents. The high bid gets the player, but you have to be careful not to use up your points too early in the season.

Step 8

Have fun. That's what it's all about.

The FSTA also provides the following example of a baseball fantasy league:

How to Play Fantasy Baseball

Every day, more and more sports fans are becoming familiar with the rules and regulations of fantasy baseball. For anyone interested in starting a league, it's as easy as one-two-three. All you have to do is follow a few flexible rules and take it from there. The beauty of fantasy baseball is that there really isn't any set guideline you MUST follow. It's your fantasy league, so fantasize any way you want. The main thing is to enjoy baseball and enjoy fantasy baseball. That's it. OK, let's take it step by step and get you started.

Step 1

Assemble a handful of baseball fanatics who are willing to wheel and deal throughout the course of the baseball season. There is no set number, mind you, but 10 teams is great and 12 teams is perfect. Anything less than eight makes it a league filled with all-stars, while anything more than 12 is pushing the impossible. Make sure you find guys who are just as nuts about baseball as you are, and it will help immensely if a couple of the players have been in a fantasy league before.

Step 2

Elect a commissioner. He or she will be responsible for compiling weekly statistics of every team, and can be called the High Exalted Commissioner for Life or something of that ilk. The commissioner should be somebody that every team owner respects because he/she will be responsible for the league constitution, bylaws and all final decisions. One of the commissioner's responsibilities is writing the league newsletter, which goes out every week or two with complete standings and statistics, or typing into the computer if it's an on-line league.

Step 3

One of your first big decisions will be to decide whether to mix players from the American and National leagues or to compete with players from just one league. If you mix leagues, the number of teams can be greater than 10 or 12. Using just one league has the advantage of making every owner use stars, backups and scrubs. Mixing the leagues, of course, provides enough superstars for every team.

Step 4

Each team is composed of 23 players taken from the active rosters of the NL and/or AL teams. Each team's roster usually consists of two catchers, one first baseman, one second baseman, one shortstop, one third baseman, one middle infielder (second baseman or shortstop), one corner infielder (first baseman or third baseman), one designated hitter (for AL leagues, or call him a utility player for NL leagues), five outfielders and nine pitchers. The pitching breakdown is usually five starters and four relievers, although that isn't written in stone.

Step 5

Players are acquired in one of two ways—and here's one of the slight differences between Rotisserie baseball and fantasy baseball. Generally, fantasy baseball uses a draft to select teams, much like the NFL does. Each team is responsible for filling its 23 roster positions, but the owners can pick any player at any position whenever their turn in the draft comes up. Some leagues hold drafts in January and February and draft as many as 40 players per team, and then cut down to 23 by Opening Day. Other leagues pick after Opening Day and fill their 23-man roster through the draft, using only players that made major-league rosters. To pick the draft order for an inaugural season, cut cards, draw straws or do something equally scientific. Rotisserie baseball is different in that teams are formed using an open auction to select players. Each team is assigned $260 to allocate for player salaries. Unlike the first method of drafting, the order of auctioning players doesn't matter. The minimum first bid is $1. Bidding then proceeds around the room at minimum increments of $1 until the player is purchased by one team owner. The process is repeated until every team has a full complement of 23 position players. With this method, each team has to stay within its budget.

Step 6

Team rankings are tabulated using four or more offensive categories and four pitching categories. The offensive statistics most often used are composite team batting average, total home runs, total runs batted in and total stolen bases, with runs scored the fifth-most popular choice. The pitching categories are usually composite team earned-run average, total wins, total saves and composite team WHIP Ratio (walks plus hits divided by number of innings pitched), and strikeouts are also often used.

Step 7

Know your rules. For instance, if you're in a 10-team league, the team that finished first in a category earns 10 points, the second-place team gets nine points, third place eight points and so forth down to the last-place team getting one point. So the team with the most home runs by its 14 offensive players receives 10 points, while the team with the least number of home runs gets just one point. This system works for all categories, each of which have equal value, so the most points a team in a 10-team league with eight categories could receive if it won every category is 80 points.

Step 8

The biggest headache for the commissioner used to be compiling team statistics. That was before the Internet, that is, and the development of stats services. Very few leagues currently compile their own stats. Your best bet is to search on-line or check out the ads in this magazine. You'll find that because of competition, the price can be very reasonable, or even free.

Step 9

Transaction deadlines must be set. It used to be that leagues would use USA Today for their stats, so the week would run from the time USA Today ran its stats for each league on Tuesday and Wednesday. Now, most stat services run on a Monday through Sunday week, and many on-line services are flexible enough to allow you to determine when your weekly transactions must be made. Most often, it's Monday afternoon.

Step 10

A player is eligible to be drafted at any position at which he appeared in 20 games or more during the preceding year. Because of this rule, Fantasy Sports Magazine includes games played at each position for every player who is analyzed in this issue.

Step 11

If one of your players is put on the disabled list, sent to the minors or released, he may be replaced by a player who is unprotected by any other team. If Carlos Lee gets hurt or somehow gets sent back to the minors midway through the season and is replaced by Jeff Abbott, you could put Lee on your protected list and pick up Abbott as a free agent. But when Lee returns from the minors or the DL, you have to cut one of them for good.

Step 12

Each league has to make decisions on how they want to play and for what price. We do not recommend you play for money; think of the $260 figure as a form of Monopoly money. But a league traveling trophy is a good idea, so that at least you have something concrete to play for.

Step 13

Don't get too complicated with your rules. For starters, we recommend that you don't include any more statistics than the eight proposed, although runs and strikeouts are also used in many leagues across the country. Those eight categories will give you a clear indication of the better team.

Another bit of advice—if you want to play fantasy sports in the future, plan on being on the Internet. That's where the game is headed, although many services provided stats that can be faxed or mailed, and those leagues can be just as fun. Finally, keep it simple and have fun. That's the entire groundwork you'll need to start a fantasy baseball league. We hope this will help you get a league started. Soon you'll find out what more than 4 million fantasy baseball fanatics have been enjoying for the last decade.

Other sports and fantasy formats including various fantasy settings, such as those set forth above, are described herein, disclosed in the Background section of U.S. Provisional Patent Application 60/869,831, and/or are known to one of ordinary skill in the art.

SUMMARY

Several embodiments disclosed herein relate to a video gaming system and related network that interfaces with an online fantasy sports game. The video game play is enhanced using various features of a fantasy sports game. Similarly, the fantasy sports game can be enhanced using various features of the video game play. Further, in another embodiment, the video gaming system and related network allows real-life attributes (e.g., real-life environmental attributes and/or real-life player attributes) to be incorporated into video game play. In yet another embodiment disclosed herein, the video gaming system and/or fantasy sports game are associated with a virtual world. Still other embodiments can include combinations of the above aspects with an open video game whereby player feedback is used to directly modify the video game played by the user giving the feedback and can be used to modify the video game played by other players via a connection to a network including the internet.

One embodiment of the invention is related to a video game program product in the form of instructions on a storage medium. The video game program product includes sports video game instructions, video game character parameters, and video game image data configured to provide a sports video game in conjunction with a video gaming machine. The video game program product includes instructions configured to enable the video gaming machine to download a fantasy setting of an online fantasy sports league. The video game program product includes instructions configured to modify a sports video game parameter and/or image data of the sports video game using the fantasy setting. In one embodiment, the fantasy setting includes a fantasy team roster and the downloaded fantasy team roster is used to modify a roster of a video game team.

In one embodiment, the fantasy team roster can include a list of active status fantasy team members and a list of non-active status fantasy team members. Similarly, the video game team can include a list of active video game characters and non-active video game characters. The video game program product includes instructions configured to synchronize the status of a particular video game character with a particular fantasy team member where both are associated with the same real-life athlete.

In another embodiment, the video game program product includes instructions configured to enable the video gaming machine to download a video game parameter that is associated with a real-life attribute (e.g., a player performance parameter) and instructions configured to modify at least one sports video game parameter and/or image data of the sports video game using the downloaded video game parameter. A particular video game character can be associated with a particular real-life athlete by modifying a video game performance parameter of the video game character using the real-life performance attribute of the particular real-life athlete.

In one embodiment, the performance parameter can be a predictive performance parameter where the prediction is associated with a real-life prediction of a players' performance and/or team's performance in an upcoming sporting event. The real-life prediction can be based on fantasy league data (i.e., fantasy league player selections), poll data, and/or the opinion of one or more experts, so long as the data is generated close in time to the real-life sporting event (e.g., within a week or within days of the sporting event).

Examples of suitable video game performance parameters that can be modified include, but are not limited to, catching, throwing, kicking, hitting, driving, sliding, running, tackling, missing, jumping, passing, stopping, turning, or rate of wearing out a device action of the particular video game character.

Yet another embodiment of the invention includes a method and/or system for updating a sports video game with fantasy settings, player performance parameters, and/or video game image data. The method includes hosting an online fantasy sports league and transmitting a fantasy team roster to a video game machine via a network. The fantasy team roster includes a list of real-world athletes associated with video game characters of the sports video game to be played on the video game machine.

One aspect of the present invention is that the gaming system can receive frequently changing fantasy settings, video game parameters, and/or image data. Because this data is associated with real-life attributes, the data can be changing on a monthly, weekly, daily, or even by the minute basis. For example, where the fantasy setting includes a team roster, the team roster can be a dynamic team roster that changes periodically during a fantasy sports league season. In the case where the fantasy league is Fantasy Football, the fantasy roster typically changes on a weekly basis.

In one embodiment, the downloaded fantasy setting or video game parameter can be modified a plurality of times during a sports season, more preferably at least on a monthly basis, more preferably on a weekly basis. Most preferably the downloaded fantasy setting or video game parameter can be updated at least as frequently as the online fantasy league is updated and/or at least as frequently as the occurrence of the real-life competitions associated with the real-life athletes.

Interfacing the video gaming system and related network with the online fantasy sports game according to the various embodiments of the invention brings a unique element of play to video gaming. For example, the video game user can become a manager of the video game team and makes decisions about what team members should or should not be played over the course of a sports season. The video game competition can be more meaningful than traditional sports video games because the video game user has a significant input as to how the video game characters are programmed to play. Moreover, the video game team and/or the performance of the individual video game characters can be changing on a frequent basis (often as frequently as the real-life athletes compete). Interfacing the sports video game with the fantasy sports league brings an element of play to the video game that would likely be impossible to accomplish using traditional techniques for designing sports video games.

An embodiment of the invention includes a method for updating a sports video game with video game parameters relating to a real-life environmental attribute. The method includes, identifying a real-life environmental attribute associated with a real-life sports event and converting the real-life environmental attribute to a video game environmental parameter. The video game environmental parameter is transmitted to a video game machine via a network such that the video game environmental parameter is incorporated into the sports video game. The video game environmental parameter can be used as is or used to modify other video gamer parameters (e.g., player performance parameter) or used to modify video game image data.

Examples of real-life environmental attributes that can be converted to a video game environmental parameters include, but are not limited to, conditions at a real-life sporting event where it is sunny, cloudy, shady, raining, snowing, sleeting, thundering, lightening, hot, cold, slippery, wet, dry, humid, hard ground, soft ground, and/or windy (including wind speed and wind direction).

In yet another embodiment, the invention includes hosting a virtual world in which users create personal motional avatars and navigate a virtual world. The personal motional avatars are capable of walking, running, and/or flying to navigate the virtual world and are able to interact with other personal motional avatars. The hosted virtual world allows users to participate in one or more activities related to owning and operating an online fantasy team. For example, the fantasy team owners can participate in a fantasy league draft, trade fantasy team members, modify a team roster, and/or select the active or non-active status of team members from within the virtual world.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates a fantasy team page;

FIG. 2 illustrates a current matchup page;

DESCRIPTION OF SEVERAL EMBODIMENTS

Figure 3:
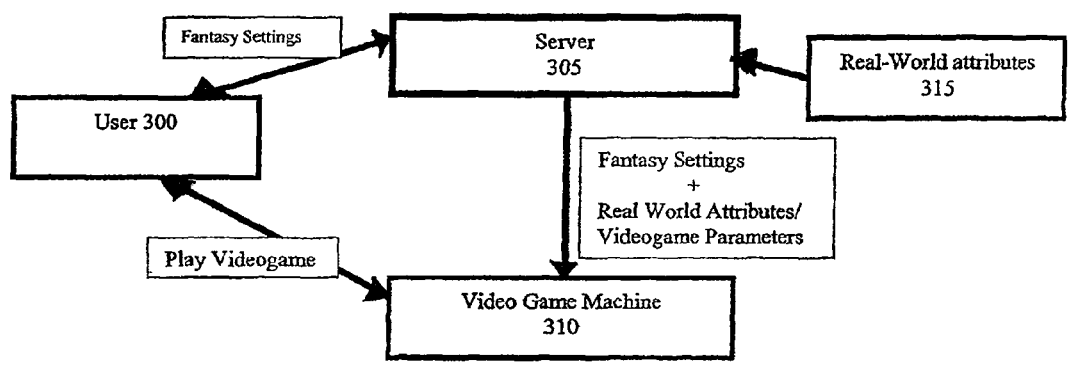
FIG. 3 illustrates a system for providing a sports video game that incorporates real-life attributes, fantasy league settings, virtual identity/virtual world aspects, advertisement and/or open video game aspects.

Embodiments disclosed herein relate to a video gaming system and related network that interfaces with an online fantasy sports game. The video game play is enhanced using various features of a fantasy sports game. Similarly, the fantasy sports game can be enhanced using various features of the video game play. Further, in another embodiment, the video gaming system and related network allows real-life attributes (e.g., real-life environmental attributes and/or real-life player attributes) to be incorporated into video game play. In yet another embodiment disclosed herein, the video gaming system and/or fantasy sports game are associated with a virtual world. Still other embodiments can include combinations of the above aspects with an open video game whereby player feedback is used to directly modify the video game played by the user giving the feedback and can be used to modify the video game played by other players via a connection to a network including the internet.

For purposes of this invention, a "fantasy team owner" is a real-life person that directs a "fantasy sport" or a "fantasy league" team (i.e., the real-life person playing the fantasy sport). Moreover, for purposes of this invention, the "fantasy team owner" is not the real-life athlete engaging in the real-life sporting events associated with the fantasy game.

I. Integration of Real-Life Attributes in a Video Game

Sports video games, such as video games simulating football, hockey, basketball, soccer, cricket, golf, as well as other sports discussed above, include various game parameters, such as video game team rosters, video game environment, and video game individual character parameters. Video game roster parameters can include active and inactive players on a video game team. Additional video game parameters are disclosed in Appendix B of U.S. Provisional Patent Application Ser. No. 60/869,831.

Video game character performance parameters relate to how a video game character performs in the video game.

According to the teachings disclosed herein, the video game character performance parameters may be associated with real-life athlete attributes, such as being associated with rushing yards, passing yards, touchdowns, goals, points, assists, save percentage, field goal percentage, batting percentage, speed, strength, agility, likelihood of dropping a ball or creating a turnover, likelihood of creating an error, accuracy, temperament, and/or ability in many other respects. Also, the real-life athlete attributes incorporated as video game character parameters can include specific athletic moves where, as a real-life athlete develops different moves (or actions), the video game can be updated with simulations of the new moves. Success rates of the real-life moves can also be incorporated into the video game. Moreover, as the success rates of real-life athlete moves vary, for example a spin move is not as successful as it used to be, such real-life attributes success rates may be incorporated into the video game. Thus, the character in the video game can evolve over time as the associated real-life athlete evolves in real-life. Any real-life athlete attribute, which may be represented as a performance statistic, can be manually, automatically or semi-automatically included in a video game as a video game character performance parameter according to the teachings disclosed herein.

Real-life attributes may also include how a real life team is developing, including changes in team colors, jerseys, fields, performance, and fans. For example, where a real-life team or athlete is on a hot streak, or particularly emotional, such parameters may be incorporated into the video game. Where the real-life team tends to perform to the crowd, or have a particular rivalry, such real life team attributes may be incorporated into the video game, in some embodiments by relative real-time updating, or periodic or selectable updating, as such real-life attributes are developed.

The age and appearance of players and other real-life physical attributes may also be updated in the video game. For example, bruises, lost teeth, braces, casts, haircuts, etc. can be incorporated into the video game as such changes occur in real-life. For example, video game parameters associated with an appearance of a video game character representing a real-life athlete can be modified (or updated) as the appearance attributes of the real-life athlete changes in real-life.

Moreover, other real-life fan attributes may be incorporated into the video game. For example, where a real-life team's fans include a team associated group of fans, such as the Cleveland Dog Pound or the Raider Nation, such real-life fan attributes may be incorporated into the video game as video game parameters. As such fan attributes change in real-life, such changes in fan attributes may be incorporated into the video game in real-time or as the video game receives periodic, or initiated, updates of video game fan parameters. The fans can do animated actions simulating real-life fan actions, such as a fan wave, throwing items on the field, heckling a video game character, tearing down a goal post in a particularly good comeback or important victory, or otherwise simulate any action of real-life fans.

Real-life reactions of fans can also be incorporated into the sports video game. For example, where a team is a visiting team the fans in the video game can be configured to react as those visiting team fans which they represent. Moreover, where the team is a home team, the fans in the video game can be configured to react as the home team fans which they represent and can be modified over time as the fans themselves change in real-life. Visiting fan sections can also be more accurately represented in the video game via the updating of video game parameters.

Real life mascot attributes can be incorporated into the sports video game. For example, a team may have a team associated mascot and a virtual mascot representing the real-life attributes of the real-life mascot can be incorporated into the sports video game as video game mascot parameters. Moreover, as the real-life mascot develops new tricks or reactions to fans the video game mascot parameters can be updated such new real-life mascot attributes such that the video game mascot more closely resembles the real-life mascot.

Coaching parameters may be modified as coaching attributes change in real-life. For example, where a real-life coach changes reactions, plays, lineups, clothes, comments, instructions, and attitude, such real-life coach attributes can be incorporated into a sports video game. For example, where a coach begins to wear certain attire the associated video game coach character is updated via a connection to a network including the internet such that the video game coach character begins wearing virtual attire representing the attire of the coach in real-life.

Commentary parameters can be changed in the video game to represent real-life commentary attributes. For example, real-life commentary clips, whether video, audio, text, or other, may be incorporated into the sports video game such that the sports video game includes parameters related to real-life commentary. Moreover, such real-life commentary can be selectable such that the video game may include commentary by a particular commentator, such as Bob Costas or Steve Madden. Real-life clips or animated characters representing commentators can be incorporated into the video game and associated video game commentator characters updated as real-life commentators change.

Environmental parameters may be modified in the video game to represent real-life environmental attributes. For example, where a new camera angle is used, where half time shows are presented, cheerleader outfits and dances, animations shown on real-life television shows, and other real-life visual attributes may be incorporated into the environmental parameters of the sports video game. Other real-life environmental attributes, such as real-life weather, stadium, field conditions, course, and other environmental attributes can also be incorporated as video game environmental parameters such that virtual/simulated weather, stadiums, golf courses, and field conditions more accurately represent the real-world conditions which they represent. For example, if it is snowing at Lambeau field in real-life simulated snow conditions can be incorporated into Lambeau field in the sports video game. Examples of weather attributes include whether it is sunny, cloudy, shady, raining, snowing, sleeting, thundering, lightening, hot, cold, more exact temperature attributes, slippery, wet, humidity, and/or dry in real-life.

Such environmental attributes and changes in video game environmental parameters can also affect video game character performance parameters. For example, where it is wet, cold, windy, or snowing in real-life and such environmental attributes are incorporated into the video game parameters, such visual conditions can effect video game character parameters by causing a higher (or lower) likelihood of fumbles, slips, inaccuracy, or missed shots, for example. Any performance effect that would occur in real-life as a result of the environmental conditions can be incorporated into the video game parameters and affect the video game character performance. Other video game character performance parameters that can be affected by environmental parameters include speed, agility, stopping, catching, throwing, kicking, hitting, driving, sliding, running, tacking, missing, jumping, passing, stopping, turning, wearing out equipment, and/or mechanical performance of a device, such as a car, in the video game. Moreover, where a particular real-life athlete is particularly affected by environmental conditions, video game parameters can be modified such that a video game character associated with the real-life athlete is affected in a similar manner by the environmental conditions as the associated real-life athlete. As used herein, a video game character associated with a real life athlete is a video game character intended to represent that real-life athlete in the video game.

The sports video game (or a fantasy league) can include a computer generated post game highlights and tournament summary creation software that automatically (or can be a video editor for use by a user) to create a video clip summary of a video game or fantasy competition. For example, the highlight software can select key actions or match ups from the video game competition, tournament, or fantasy competition and introduce commentary to create an edited video. There can also be an ongoing commentary video regarding fantasy league play where at the end of the season a video can be viewed that summarizes that season or multiple seasons. For example, where a particular team owner continues to win multiple seasons a "dynasty" video can be created and such video sent to friends or shown in the virtual world as discussed below.

Any other parameter of the video game may incorporate any aspect of real-life sport attributes. Various embodiments of the invention disclosed herein relate to affecting these, as well as many other, sports video game parameters based at least in part on at least one real-life attribute and/or at least one fantasy setting as described in further detail hereinafter.

While in a preferred embodiment the video game parameter associated with the real-life attribute is typically used in conjunction a fantasy setting, as discussed below, the present invention also extends to embodiments where a real-life attribute is converted to a video game parameter and downloaded to a video game system, also described below, without being associated with a fantasy sport. For example, in one embodiment, a real-life environmental attribute can be converted to a video game environmental parameter and used to modify video game play without any association to an online fantasy game.

II. Integration of Fantasy League Settings in a Video Game

According to the teachings disclosed herein, a video game can incorporate a fantasy setting from an online fantasy league. For example, the video game can incorporate a player's fantasy roster setting such that the video game user can play a sports video game using a fantasy roster of players.

In one embodiment, the fantasy team roster can include a list of active status fantasy team members and a list of non-active status fantasy team members. Similarly, the video game team can include a list of active video game characters and non-active video game characters. The video game includes instructions configured to synchronize the status of a particular video game character with a particular fantasy team member where both are associated with the same real-life athlete.

Moreover, fantasy settings can be incorporated into a video game to take into account real-life attributes related to the fantasy game, such as attributes related to a relative difficulty of an upcoming match-up. For example, if an opposing team which a real-life sports athlete is playing is particularly difficult, then the difficulty can be incorporated as a video game parameter of the video game. For example, if a real-life football athlete is a wide receiver and a team which that athlete is playing in real-life has a particularly strong passing defense, relative match-up strengths and weakness of this real-life athlete can be taken into consideration and a parameter of the video game can be affected based on this comparison. Thus, match-ups of each real-life athlete in each fantasy team of the fantasy league can affect a parameter of the video game played. The match-ups can take into account a particular player's abilities to do well against the opposing team, and/or take into account a particular player of the opposing team (such as a particular cornerback, tackle, secondary, offense, goalie, pitcher, batter, and/or defense) and may affect a parameter of the video game, such as the player's speed, agility, likelihood of dropping a ball, being intercepted, crashing, or missing a shot, etc based on a comparison of the real-life upcoming match up.

For example, Chad Johnson (currently a wide receiver for the Cincinnati Bengals) may have had particular difficulty (or lack of difficulty) against a team (such as the Baltimore Ravens) or a player (such as Dante Hall). Such predictive or historical strengths and weaknesses can be taken into consideration and affect a parameter of the video game play. For example, if Chad Johnson typically had a catch ability in a video game of 8/10, the catch ability can be increased (or decreased) based on the upcoming, historical, or recent match up. For example if Chad were playing Donte Hall this Sunday and Chad has historically had a difficulty in this match up, or more attention is expected to be place on Chad by the upcoming secondary, Chad's catch ability can be reduced to 6/10 based on such prediction of future performance or historical performance. Similarly, if the secondary is expected to double team Chad, or has historically (or recently) double teamed Chad, this real-life attribute can be incorporated into the video game parameters such that a video game character associated with (e.g. representing) Chad is double teamed or has a reduced catch ability in the video game consistent with real-life occurrences or expectations of future real-life occurrences. This comparison is particularly important where fantasy rosters are incorporated into video games as the fantasy roster including players from various different real-life teams. Predictive performance attributes can also be based on actions of fantasy team owners. For example where a certain percentage of fantasy team owners are starting a particular fantasy team member then a prediction of success can be made on this basis as well.

The parameters of the video games may also be controlled based on a fantasy league rule. For example, in a fantasy league where a number of yards, or a goal, receives more points than in another league, a player that may typically receive relatively more points from yardage than scoring goals can be taken into consideration and affect a parameter of the game. Thus, any rules particular to the player's fantasy league can affect a video game parameter.

Team owners in a fantasy league can then play an associated sports video game or tournament of games having the same roster as their opponents in their fantasy league. The video game can also include parameters associated with any setting or relative difficulty of each player in the fantasy league and current real-life attributes of the players such that the video game more closely resembles the difficulty of the matchup in the fantasy league.

For example, referring to FIG. 1 a fantasy team page is illustrated for a fantasy team named Gabriel, which competes in a fantasy league named Da Boyz. Currently, the fantasy league is in the fourteenth week of play and the fantasy team page lists fantasy team members of the fantasy team Gabriel. For example, as shown, fantasy team Gabriel currently includes real-life athletes Tony Romo, Sean Alexander, Edgerin James, Patrick Crayton, Joey Galloway, Steve Smith, Tony Gonzalez, Matt Stover, the Ravens defense and special teams, Jesse Chatman, Ron Dayne, Deshaun Foster, Jerrico Cotchery, and the Lions defense and special teams. Currently the Gabriel team fantasy roster settings include these players of which Chatman, Dayne, Foster, Cotchery and the Lions defense and special teams are currently designated as reserve, or inactive. Therefore, only the active players will compete in the week 14 match up unless the fantasy team owner of fantasy team Gabriel makes a change (or substitution) to the fantasy team members currently designated as active and reserve. According to the teachings disclosed herein, the fantasy team roster and designation of active and reserve players can be incorporated into a video game such that a user of the video game (e.g. the same fantasy team owner) can compete in the video game against other users of the video game (e.g. other fantasy team owners) using characters of the video game representing the same members of their fantasy team roster.

For example, the roster of FIG. 1 can be downloaded to a video game machine and a video game team can be set up that includes at length video game characters representing Romo, Alexander, James, Crayton, Galloway, Smith, Gonzalez, and the Ravens defense and special teams. The user of the video game can also vary the active and reserve players in the video game to substitute Chatman, Dayne, Foster, Cotchery, and/or the Lions defense and special teams. If the user determines that a lineup change is preferred in the online fantasy league as well, the user can also cause the video game machine to transmit a modified roster to a server or other device hosting the online fantasy league such that the fantasy team roster is modified according to the changes made in the video game machine.

As discussed above, real life predictive, or historical attributes, can also be incorporated into the video game and can include a historical or predictive relative difficulty of performance for a real-life athlete in a fantasy match up. For example, referring again to FIG. 1, the current match up for each fantasy team member is shown for week 14. Tony Romo, for example, will be playing against Detroit, the environment is predicted to be in a Dome (thus clear), Tony's average fantasy performance for the season is currently 25.9 points, and Tony is predicted to achieve 24.4 points against Detroit this week. Thus, these predictive attributes can be incorporated into the video game such that a video game character representing (i.e. associated with) Tony incorporates video game parameters associated with a manner as he is predicted to perform against Detroit. For example, if Tony typically throws a lot of touchdowns, interceptions, runs well, scrambles, etc. in real life such attributes can be converted to video game parameters such that the video game character representing Tony more closely represents the predicted (or historical) real life behavior of Tony. After Tony has played Detroit in real-life, his performance for week 14 is known and the video game can be updated with video game parameters more closely representing his actual performance attributes of week 14. Similar video game parameters can be incorporated into the video game for each of the other fantasy members of each fantasy team of a fantasy league. For example, referring again to FIG. 1, such video game parameters associated with real-life attributes can be incorporated for Alexander, James, Crayton, Galloway, Smith, Gonzalez, Stover, the Ravens, Chatman, Dayne, Foster, Cotchery, and the Lions as well as Romo. Therefore, team Gabriel can compete against a current matchup both in the online fantasy league and in a video game format.

For Example, referring to FIG. 2 a current matchup for week 14 for fantasy team Gabriel is shown. As shown, fantasy team Gabriel is competing against fantasy team Jo Mama and the active fantasy team members of each team are shown along with a predicted performance. The reserve players are also shown for each team. Of course, the fantasy team players and lineup of fantasy team Gabriel and fantasy team Jo Mamma can be altered up until the time when a week 14 real-life match up for each fantasy team member begins in real-life, or up until a cutoff time has passed for changes to a fantasy team roster.

According to the teachings disclosed herein, the fantasy team rosters of team Gabriel and team Jo Mama can be downloaded to one or more video game machines such that users of the one or more video game machines can compete with video game teams having video game characters associated with the fantasy team rosters of the respective fantasy teams. Further, real-life historical and/or predictive attributes for each real-life athlete can be incorporated into the video game to enhance the reality of the current week 14 (or previous/future) match ups.

Of course, the real-life attributes incorporated into the video games need not be associated with fantasy settings and online fantasy game play as disclosed in section I of this specification. However, embodiments disclosed herein which combine both real-life attributes with fantasy game play and online fantasy game competitions with video game parameters find particular synergistic and unexpected benefits.

According to the teachings herein, a combined online fantasy game and video game scoring system can be used. For example, the combined online and video game scoring system can include a comparison of members of an online fantasy league performance in video game competition and performance in the online fantasy league to determine overall performance. In one embodiment, the members of the online fantasy league can compete via the video game with their match up in the fantasy league each week to determine a video game victor. Such results can be used in conjunction with fantasy league competition results to determine a combined video game and fantasy league score, and/or victor. Instructions for enabling the combined online fantasy game and video game play can include instructions configured to send results of video game play from one or more video game machines to a server hosting the online fantasy league. Moreover, any aspect of fantasy league setting or play can also be effected by video game competition results. For example, a draft order, handicap, or winnings in a fantasy league can be affected by a video game competition result.

In one embodiment, a performance parameter of the video game can be a predictive performance parameter where the prediction is associated with a real-life prediction of a players' performance and/or team's performance in an upcoming sporting event. The real-life prediction can be directly or indirectly acquired. For example, the predictive data can be collected directly through users and/or experts by taking polls that predict the outcome and/or performance of real-life players and teams in the upcoming sporting event.

Alternatively, the real-life prediction can be obtained indirectly. For example, a real-life prediction can be obtained from fantasy league data. In this embodiment, data is collected relating to the fantasy team owner's selection of players (i.e., the fantasy team player's choice to bench or play a particular fantasy team member) for an upcoming fantasy sports event. The data from the fantasy team owners can be used to make a prediction about the outcome of the upcoming sports event. The more fantasy team owners that select to keep a fantasy team member inactive (vs. active) can be equated with a prediction regarding the performance of that player in the upcoming event. Greater numbers of team members playing a given fantasy team member is a prediction of better performance while selecting to not play a fantasy team member is a prediction of poorer performance. The predictive data can also be compared to prior weeks and the relative change in fantasy team members selections over a period of time can be used to predict a predicted improvement or worsening for the performance of a particular fantasy team or fantasy team member.

The real-life prediction can be based on data that is generated close in time to the real-life sporting event. In one embodiment, the real-life prediction is based on polls or data generated within one month, more preferably within one week of the particular real-life sporting event. Using predictive data that is within a month, more preferably a week of a real-life event gives the video game play an atmosphere of being played in "real-time" and enhances the competition.

In fact, video game play that incorporates real-life attributes and fantasy settings as video game parameters, video game instructions, and/or video game imagery, such as relative match-ups of each athlete in the fantasy league, can create a new point of entertainment and competition for those that are members of a fantasy league. For example, the members of the fantasy league can play the video game prior to, concurrent with, or after completion of one or more real-life sports events while having more accurate video game parameters in the video game tracking the strengths and weakness of the player's fantasy team members.

III. Open Video Games

According to the teachings disclosed herein, video games can be open in that a user of the video game can provide feedback that is incorporated directly, or indirectly, into the video game to create a modified video game. The modified video game can then be provide to other users of the video game so that users of the video game can directly make changes, updates, and improvements to the video game. Versions of the video game created by users of the video game can be made available to video game users such that video game users can select which modified version the video game user would like to play.

For example, the code of the video game, or portions of the code of the video game, can be made accessible to users of the video game such that the users of the video game can make changes to the code, or improvements to the code, to improve the video game experience themselves. Video game parameters, instructions, and/or imagery can all be made accessible or each one to users of the video game such that the users of the video game can modify the video game parameters, instructions, and/or imagery. For example, in a sports video game a user can add a simulated move of a character of the video game such that the move is made available in the video game. The user can provide a video game character move to edit moves or to make such improvements. The user can also change an instruction of the video game such that a format or setting of the video game is changed. The user can change a parameter of the video game. For example, the user can disagree with a video game character performance parameter assigned to the video game character and vary the parameter in accordance with the user's opinion. The user can also modify or supply imagery for incorporation into the video game. The imagery can include a video game character's appearance imagery, stadium imagery, fan imagery, coach imagery, or any other imagery in the video game such that the sports video game more closely resembles current real life features of which the video game imagery is intended to represent. The user can be provided edit software for completing such modifications and for submission of such modifications.

The modifications made to the video game can be administrator controlled where prior to dissemination of the modifications to the video game community an administrator must first approve of such modifications. However, the modifications can be user, or community, controlled where users of the video game must approve, or not reject, the modifications before such modifications are made available to other users of the video game. For example, after a first user has made modifications to a video game and submitted the modifications to an online review system, other users can review and test the changes (e.g. a Beta) made by the first user. If the other users approve of the modifications or do not reject the modifications, then the modifications to the video game can be more widely distributed, or made accessible, to other users of the video game. Thus, modifications to the video game can be peer reviewed prior to incorporation into a new downloadable version of the video game. Moreover, the peer review of the modified video game can include additional modifications by other users reviewing the previously modified video game so that additional improvements can be made during peer review.

The video game can provide a video game editor software enabling the users to develop additional levels and aspects to the video game. For example, the users can develop obstacles, parameters, and new types of fields for video game play. The users can develop team jerseys and visual customizations to the aspects of the video game. The users can also develop additional intersections between the video game and the virtual world such that an avatar is able to cross over from the virtual world to the video game and participate in the video game along with other characters of the video game. For example, the personal avatar of a fantasy team owner can be shown at the sidelines of the video game and interact in the video game with characters of the video game. In some embodiments the personal avatar can participate in the video game competition.

The modifications made to the video game need not be directly made by the video game users, however. For example, changes to the video game can be based on feedback received from one or more users of the video game. The modifications to the video game discussed above can also be referred to as user feedback, but in this instance such feedback creates a forum for user initiated change, but in this embodiment such change is not directly affected by the user.

For example, in one sports video game embodiment an "open guru" can be incorporated. The open guru can be a video game character performance prediction (or historical real-life athlete performance attribute) that relates to how the video game character performs in the video game. For example, where a performance prediction for a real-life athlete in a real-life upcoming competition is incorporated into a sports video game, users of the video game may not agree with the prediction. For example, where a performance prediction for a particular real-life athlete is initially estimated to be 10 but users of the video game (or members of a fantasy league) disagree with the performance prediction, the users can provide feedback to rebut this initial performance prediction. Based on this feedback received from users of the video game (or members of a fantasy league), a modified performance prediction may be made either automatically, semi-automatically, or after administrator approval. Thus, changes to the video game (or the fantasy league) can be made based on feedback received from one or more users of the video game (or members of the fantasy league).

Any modifications to the video game disclosed herein can also be temporary or selectable such that a user can return to previous settings such that where the user does not like a new version, or changes made to the video game, the user can "restore" the previous settings and configuration. The open video features of the invention can be carried out alone or in combination with other features of the invention, including the use of fantasy settings.

IV. Sports Video Games in Conjunction with a Virtual World and User Virtual Identity According to the teachings disclosed herein a virtual world and virtual identities can be associated with a sports video game and/or online fantasy leagues. For example, a server connected to video game machines across a network including the internet can host a virtual world. Users of the sports video game (and/or fantasy team owners) can create motional avatars which navigate the virtual world and interact with other users via encounters with their motional avatars. The virtual world can be tangential to the sports video game in that the sports video game is not carried out in the virtual world, but the virtual world is meant to supplement the sports video game. In fact, entry to the virtual world can be based on purchase and validation of the sports video game or ownership of a fantasy team.

For example, after a user purchases a sports video game they can be allowed to log into the virtual world via their video game machine. In another embodiment, the user is allowed to log into the virtual world via a computer connected to the network as well as via the video game machine, or in place of the video game machine. However, allowing the user to log into the virtual world provides various advantages in that it will be easier to automatically verify that the user has purchased the video game as the video game will be stored on a readable medium within the video game machine.

Upon logging into the virtual world, the user creates a personal motional avatar. The personal motional avatar can have various appearances and appearance attributes, which can be controlled by the user. The user can be then allowed to navigate the virtual world and interact with other motional avatars controlled by other users.

The virtual world can include virtual currency that can be convertible with real-life currency so that a motional avatar can purchase virtual goods or real-life goods with the virtual currency. The motional avatars can also purchase virtual land with the virtual currency and add landscape, features, and objects to the virtual land to create a virtual home, business, entertainment area, or any other location that the user of the motional avatar would like.

A virtual world editor can be made available to the user of the virtual world so that the user can create virtual objects and features, or affect the landscape in the virtual world.

The virtual world can incorporate real-life attributes. For example, if a particular location in the virtual world is intended to represent a real-life location, the particular location in the virtual world can incorporate the real-life attributes. Such incorporation of real-life attributes can be made available to personal avatars, for example in the exchange for virtual currency. For example, where a user of a personal avatar creates a "crib" where the user would like to entertain users of other personal avatars, and would like the weather at the location of the crib to be the same weather as in Chicago, for example, the user can purchase weather attributes from a company hosting the virtual world such that the weather at the location of the crib is the same as in Chicago. Similarly, if the owner of the crib would like the crib to look the same as a location, such as a sports casting location, the user can purchase such features and virtual objects, or can have such features and objects automatically updated as such features and objects change in real-life. The user can add virtual sofas, virtual animated cheerleaders, and other features and can have accessible real-life bio available for other users to view. The users can also create scripts for animating their avatar, and create new games in the virtual world for their avatars to participate in.

Users can also purchase various video, audio, and text accounts of real-life sport events, fantasy sport competitions, and video game events. For example, users can purchase real-life video feeds for display in the virtual world, video, audio, or displayed text accounts of fantasy league competition, and/or video, audio, or displayed text accounts of video game competition.

For example, where the user creates the crib as described above, the user can purchase a video feed of a sports event for display in the crib. The user can also purchase a display of a fantasy team roster, fantasy league match up and completion, and/or display of a video game competition in the crib. Therefore, the user can navigate their motional avatar in the crib and view real-life sports events. A user can also view a current fantasy match up such as between the users online fantasy team and another online fantasy team (e.g. between Gabriel and Jo Mama as discussed above), and/or can view a video game competition (e.g. between the team owner of team Gabriel and the team owner of team Jo Mama using their fantasy team rosters). The user can also invite other users (e.g. other members of the same fantasy league) via their motional avatars to enter the crib and watch the various events.

Users can also be given virtual awards and/or virtual currency based on online fantasy competition results and/or video game competition results. For example, where a user wins a fantasy league competition, or a video game competition, the user can be awarded a virtual award and can display the virtual award in the crib for others to appreciate. Moreover, awards can be generated by users of the video game in a "grudge match" such that the trophy is awarded based on a fantasy and/or video game match up so that the trophy can be displayed in the virtual world and so that the winner of the trophy can create a rivalry between members of the same online fantasy league and/or friends who like to compete in video game play.

According to another embodiment a fantasy draft can be conducted in the virtual world. The fantasy draft can more closely resemble a real-world sports draft where in the fantasy draft virtual athletes drafted can be shown representing the real-life athlete as such virtual athletes are drafted. Moreover, the motional avatars of each fantasy team owner can take part in the draft and visually select the virtual athletes representing the real-world athletes which subsequently become members of the team owner's fantasy team. The fantasy draft can include commentary and recommendations in the virtual world. The virtual fantasy athlete can approach a podium or stage and hold up the jersey of the fantasy team when selected. There can be automated commentary on the selection and a board room where the fantasy team owners can discuss or consider different real-life athletes and receive recommendations. The user can also communicate with other users via a microphone and streamed audio. Such communication audio can also be computer recognized and converted to text for chat.

Therefore, the virtual world can create a new point of interaction between members of a fantasy sports league or members of video game competition. The virtual world can also be a forum for the various other inventive aspects, such as a forum for receiving feedback from users of sports video games. The virtual world can also be a forum for sports athletes and celebrities to interact with users via motional avatars. For example, results of fantasy leagues in which real-life sports athletes and celebrities can be displayed for users to view via their motional avatars. Moreover, information of interest to users of the motional avatars can be displayed in the virtual world along with advertisements as discussed in further detail below. The features of the invention relating to a virtual world can be carried out alone or in combination with the use of fantasy settings.

V. Sports Video Game Advertising and Virtual World Advertising

According to several embodiments disclosed herein, advertising can be incorporated into the video games, virtual world, and/or online fantasy gaming. The advertisements can be based on a geographic location of the user of the virtual world and/or video game. The advertisement selection and placement can also be determined based at least in part on the actions of the user within the video game and/or virtual world. For example, where the user visits certain locations within the virtual world, the user's interests can be inferred and advertisements can be selected and placed at locations within the virtual world where the user is likely to encounter the advertisements via the user's motional avatar. The advertising can be in the form of billboards, graphics on the sides of virtual objects, features and objects placed in the video game or virtual world, or a user can be given incentives to allow advertisements to be placed on land owned or jerseys used by the user, for example.

The advertisements can also be selectable. For example, where a user of a video game or a user of a motional avatar in the virtual world encounters an advertisement and would like to receive additional information, the advertisement can be selectable. Once selected, the user can be directed to a web page, or information can be made accessible, displayed, or downloaded into the video game or into the virtual world for viewing by the user. Where an email address is also associated with the user, the information can be directed to the user's email account. The information can also be directed to an "inbox" associated with land or associated with a location in the virtual world where the user can access the information.

The advertising can also be in the form of promotional awards to be used by the user. For example, where the user wins a fantasy or video game competition the user can be awarded a promotional award for redemption in the virtual world or for redemption in real-life. For example, where Company A sponsors an online fantasy league or advertises in a video game or in the virtual world, Company A can award, or give away, promotional vouchers for virtual goods or real-life goods. Thus, the teachings disclosed herein can enable a new point of advertising for companies and interest groups. Such companies and interest groups can also purchase land in the virtual world where motional avatars can visit to learn more about the products and services of the companies and interest groups and can be attracted to such locations in the virtual world by promotions.

Moreover, where an advertisement is selectable, the advertisement may direct the user, via the user's motional avatar, to a location in the virtual world where the user can receive promotional vouchers and information regarding the company or interest group. The features of the invention relating to advertising in a virtual world can be performed alone or in combination with the use of fantasy settings in a sports video game.

VI. Examples of Systems and Apparatus for Carrying Out the Inventions Disclosed Herein FIG. 3 illustrates a system for providing a sports video game that incorporates real-life attributes, fantasy league settings, virtual identity/virtual world aspects, advertisement and/or open video game aspects. According to this embodiment, a user 300 plays both an online fantasy league hosted by a server 305 and also plays a sports video game using a video game machine 310, such as a video game console, general purpose or special purpose computer, cell phone, personal digital assistant (PDA), other handheld device, or other electronic device. Most preferably and advantageously, however, the video game machine 310 is a video game console, such as the Sony PlayStation, Nintendo Wii, or the Microsoft X-Box, which are examples of well-known game consoles.

The user 300 inputs fantasy settings into the server 305 (e.g. via the Internet using a computer, such as disclosed in the Fantasy League examples in Appendix A of Provisional Patent Application Ser. No. 60/869,811). The server 305 stores information describing the fantasy settings input by the player 300. The server 305 (or multiple server(s)) also receives information 315 describing real-life attributes, such as current performance attributes of real-life athletes, real-life team attributes, real-life environmental attributes, real life appearance attributes, etc. The video game machine 310 downloads information describing at least one fantasy setting and/or a video game parameter associated with at least one real-life attribute from the server 305. The video game machine 310 records the information describing the video game parameter and/or the fantasy setting for video game play; and/or adds, modifies or deletes a video game parameter based on the video game parameter associated with the real-life attribute and the at least one fantasy setting. The user 300 then competes with the sports video game that uses the parameter associated with the at least one real-life attribute and the at least one fantasy setting as parameters affecting the sports video game play.

The server 305 can also make a virtual world and/or advertising available to the user 300 via the video game machine 310 or via a computer as discussed above.

Figure 4:
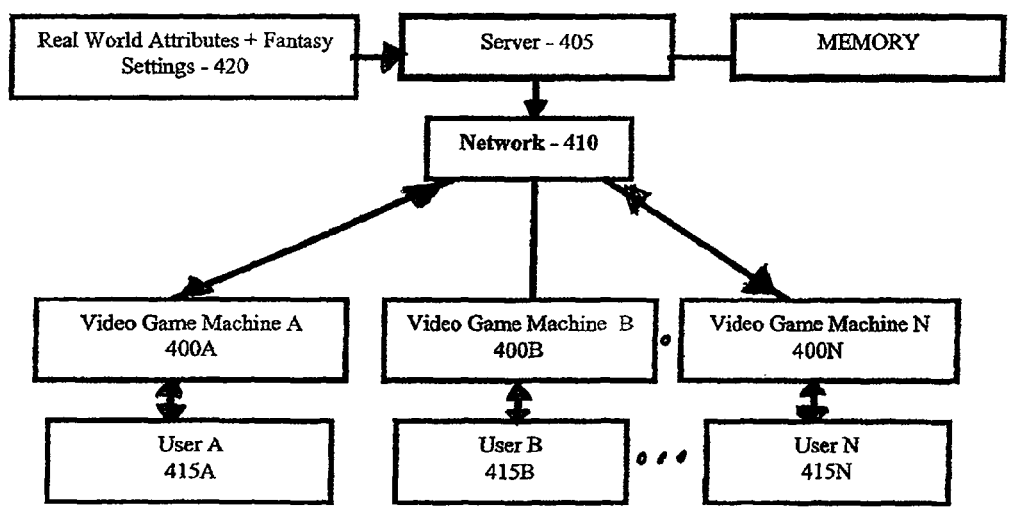
FIG. 4 illustrates a system for providing a sports video game that incorporates real-life attributes, fantasy league settings, virtual identity/virtual world aspects, advertisement and/or open video game aspects.

FIG. 4 illustrates a system for providing a sports video game that incorporates real-life attributes, fantasy league settings, virtual identity/virtual world aspects, advertisement and/or open video game aspects. The system of FIG. 4 can also enable access to a virtual world and/or advertising to users of video game machines 400A-N. Executable instructions that include initial video game parameters can be stored on a storage medium, such as a video game cd, dvd, cartridge, or can be downloaded via a data transmission link. The instructions provide the game for play by video game machines 400-A-N. The video game machines 400-A-N can include memory for video game parameter storage. The memory can also store parameters associated with real-life attributes and fantasy settings 420 for affecting the sports video game. The parameters associated with real-life attributes and fantasy settings 420 can be downloaded from a server 405 via a network 410, which may include the Internet. The parameters stored on the memory at the video game machines 400A-N associated with the real-life attributes and fantasy settings 420 can be continuously updated and current real-life attributes and fantasy settings 420 can be updated each time that the video game machines 400A-N log onto the server 405 or according to any other schedule which may be periodic or user defined, for example. The parameters may also be downloaded (e.g. renewed) each time a storage medium containing the sports video game is coupled to the video game machines. Users 415A-N then compete using the video game incorporating the settings and attributes over the network.

Figure 5:
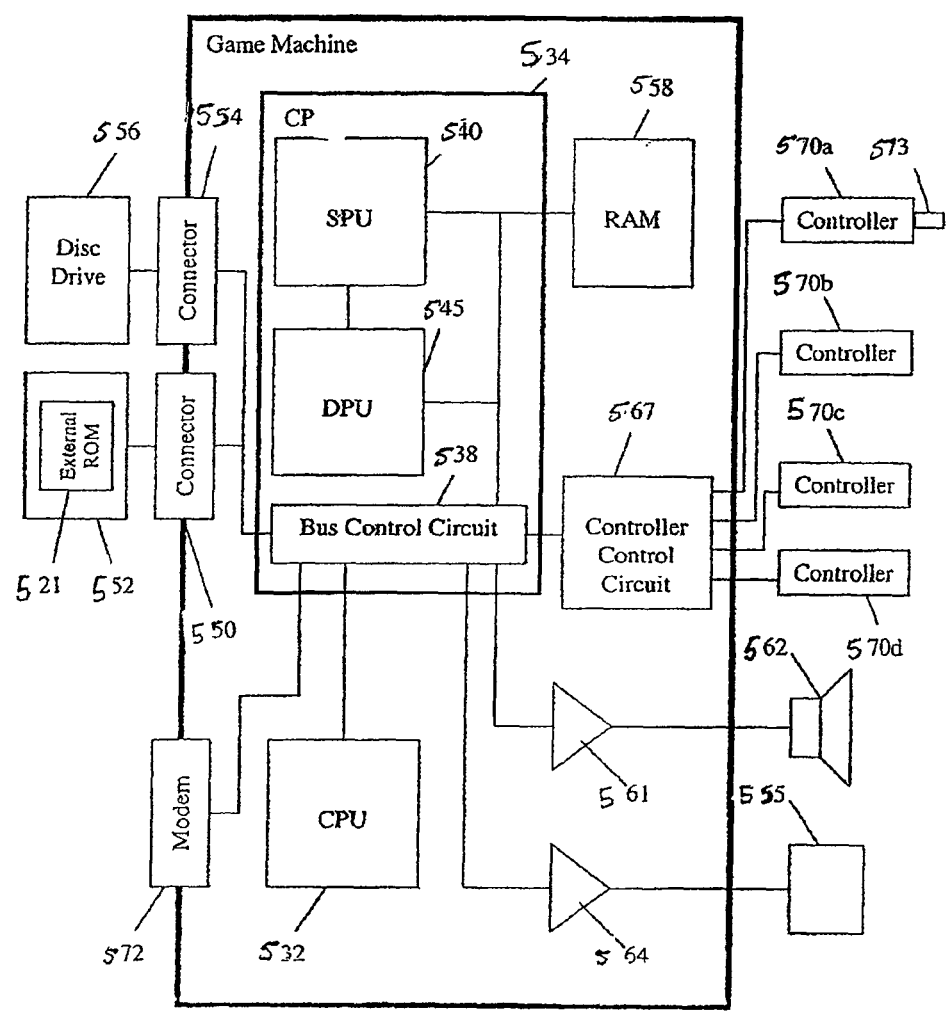
FIG. 5 is a block diagram of an example of a video game machine.

FIG. 5 is a block diagram of an example of a video game machine 520. The video game machine 520 can incorporate a central processing unit (CPU) 532 and coprocessor (CP) 534. The CP 534 can includes a bus control circuit 538 for controlling buses, a signal processing unit (SPU) 540 for performing polygon coordinate transformation, shading treatment, etc., a display processing unit (DPU) 545 for rastorizing polygon data into an image to be displayed and converting the data into a data from (dot data) stored on a memory. The CP 534 is coupled to a cartridge connector 550 for detachably mounting with a ROM cartridge 552, a disc drive connector 554 for detachably mounting with a disc drive 556, and a RAM 558. Also, the CP 534 is connected with an audio signal generating circuit 561 for outputting a sound signal to an audio output device 562, processed by the CPU 532, and an image signal generating circuit 564 for outputting an image signal to a display 565. Further, the CP 534 is coupled with a controller control circuit 567 for serially transferring operational data for one or a plurality of controllers 570A-570D and data for a RAM cartridge 573 for extension.

A modem 572 is coupled to the bus control circuit 538. The modem 572 is also preferably coupled to the internet (not shown). As discussed with reference to FIG. 4, a server coupled to the internet stores real-life attributes and fantasy settings. The modem 572 couples to the server and downloads a real-life attribute and a fantasy setting for affecting a parameter of play in the video game.

According to an embodiment, the CPU 511 can send a signal through the bus control circuit to initialize the modem 572 and control the modem 572 to download the attribute and setting information from the server. The information can be stored in RAM 558 for affecting a parameter of play of the video game. It will be understood by those of skill in the art that other configurations of video game machines are possible. For example, the CPU 532 and the CP 534, or portions of the CP 534, may be incorporated as one component. Also, for example, RAM 558, may be divided into more than one memory element, or other types of memory elements may be included. The video game machine can also be represented as currently available computers and game consoles. For example, the game machine 520 can be represented by a Playstation, such as a Playstation II or III, or a future version of the Playstation units made by Sony Corporation. Other embodiments of the game machine include the XBOX and Nintendo, such as the Nintendo Wii. For example, a Playstation III type console includes a Cell Broadband Engine CPU, a RSX GPU, 256 MB XDR Main RAM 256 MB GDDR3 VRAM, a 2.5" Serial ATA 60 GB HDD, USB connections, an Ethernet connection, IEEE 802.11 b/g WiFi connection, a Bluetooth connection, and a wireless Bluetooth controller connection supporting up to 7 controllers. Examples of video game machines are further discussed in U.S. Pat. Nos. 6,908,386, 7,019,205, and Publication 2007/0060384, the contents of these two patents and one publication are hereby incorporated by reference herein.

Figure 6:
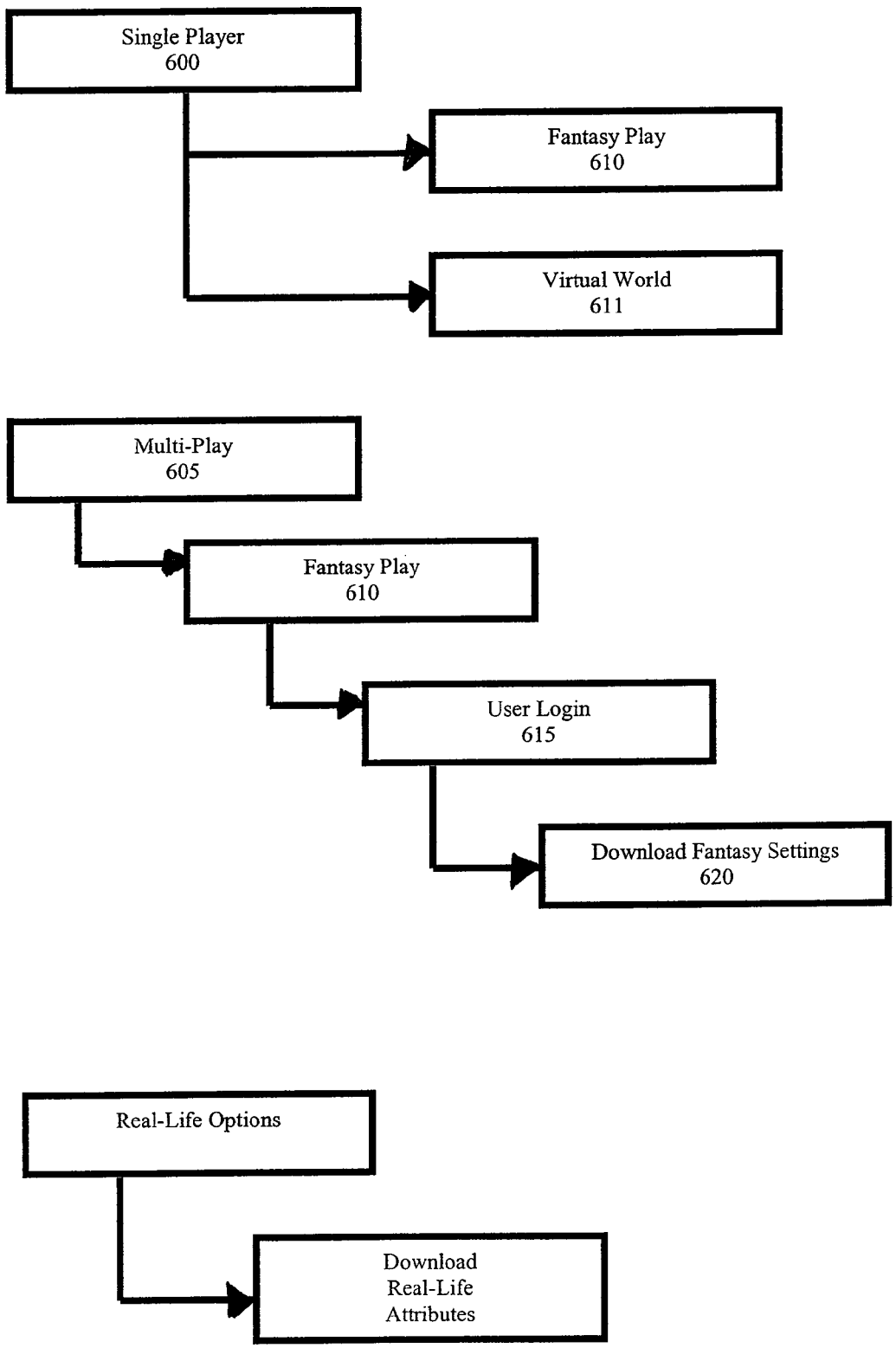
FIG. 6 illustrates an example of an interactive menu.

FIG. 6 illustrates an example of an interactive menu that may be presented to a player for selection of various game options that may be offered to a player. For example, the player may be offered a single player 600 or multiplayer 605 option along with any of various fantasy options 610 and virtual world options 611. The single player 600 and multiplayer 605 options may or may not include the real-life attributes. Effecting game parameters using real-life attributes may be selectable such that a player may be able to choose whether to use parameters that the sports game originally came with or the player can select whether to download current real-life attributes and/or settings based on online fantasy league play. The player may also select real-life attributes based on a time frame. For example, the player may select a particular date (e.g. a particular week in fantasy league play) for real-life options, at which time the gaming machine can download from the server parameters associated with the real-life attributes at the particular time.

The fantasy play options 610 can redirect the player to a screen 615 where the user enters fantasy information, such as login, password, and/or a particular fantasy league to which the player subscribes. The video game machine downloads the information 620 describing the player's fantasy settings from the server via the Internet. In some embodiments the player can modify the fantasy settings using the video game console and the video game machine can transmit the changes to the server such that fantasy settings on both the server and the video game machine are synchronized. The fantasy settings can include not only a player's fantasy roster, active players, benched players, but also any other fantasy settings including aspects of fantasy play available in online fantasy leagues. For example, the fantasy settings can include free agents, which the player can substitute into a video game lineup to try out particular match ups prior to making the trade in the player's fantasy league. The player can also select a virtual world option cell to access a virtual world.

The video game machine can be a console, such as a PlayStation, XBOX, or Nintendo for example, can be a computer, handheld, cell phone, Game boy, PSP, etc or a functional combination of the components thereof. Many players, however, feel that sports video games are better played using a console than a computer. As such, embodiments disclosed herein may be particularly advantageous when practiced using a console gaming unit, such as the PlayStation, XBOX, or Nintendo consoles. The game console can also display the sports video game on only a portion(s) of a screen such that the player(s) can view the real-life games on another portion of the screen. In multiplayer fantasy video game play the screen can be divided into multiple portions, one for each player of the multiplayer game.

FIGS. 7A-7E are block diagrams of a video game medium 700. The video game medium 700 can include video game instructions 705, video game parameters 710, and image data 715 for the video game. The video game medium can further include video game modification instructions 720 for enabling a video game machine to update the video game with parameters associated with real-life attributes, fantasy settings, modifications to the video game via open video game aspects, to provide access to a virtual world hosted by a server connected to the video game machine, and/or to provide access to advertising media.

Figure 7A:
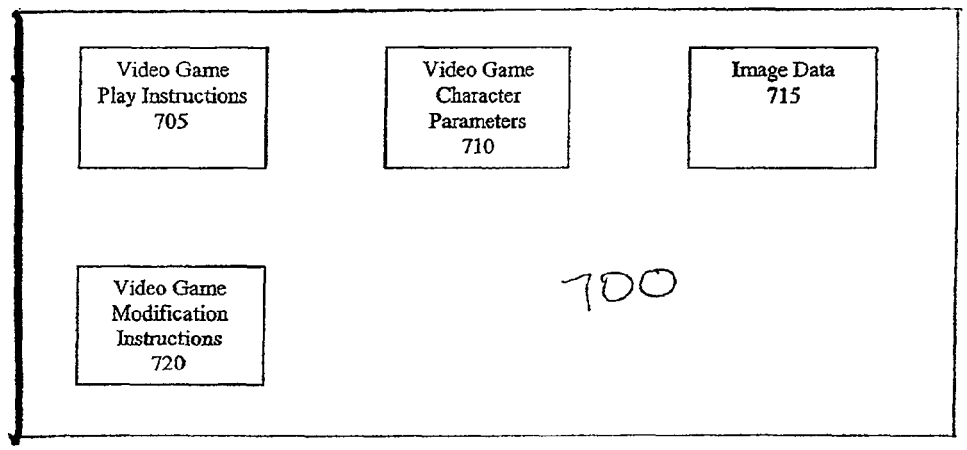
FIGS. 7A-7E are block diagrams of a video game medium.
Figure 7B:
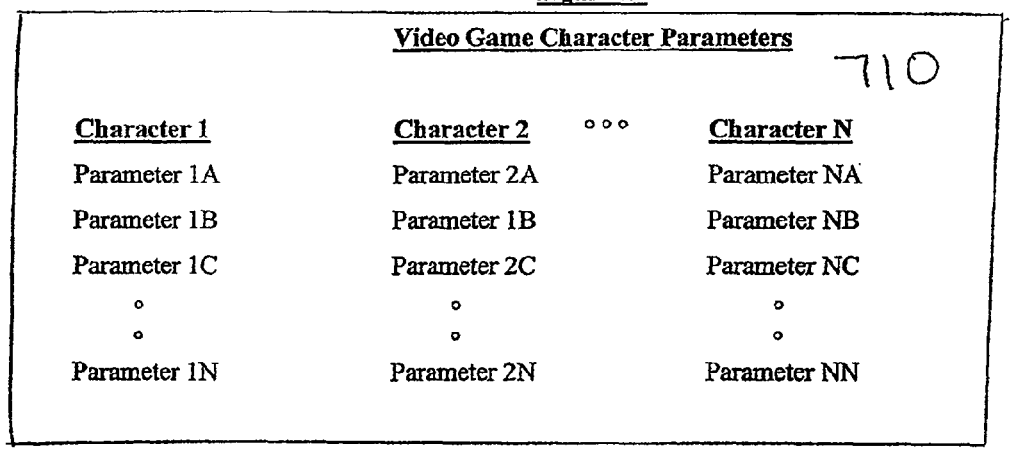

Parameters stored on the storage medium 700 can include video game character performance parameters 705 for each character of the video game. The video game character performance parameters 705 can be modified based on the fantasy and/or real-life parameters downloaded as shown in FIG. 7B.

Figure 7C:
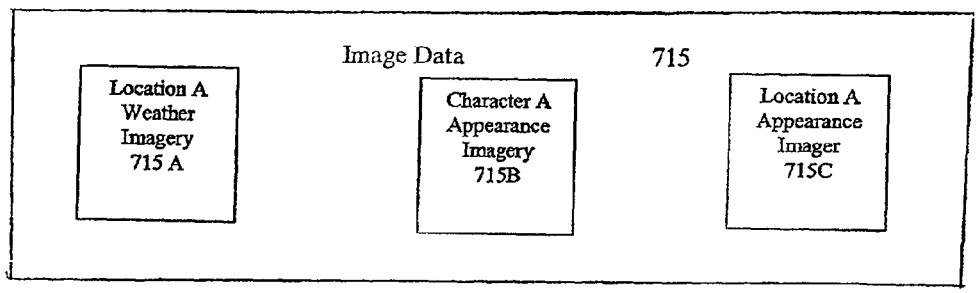
Figure 7D:
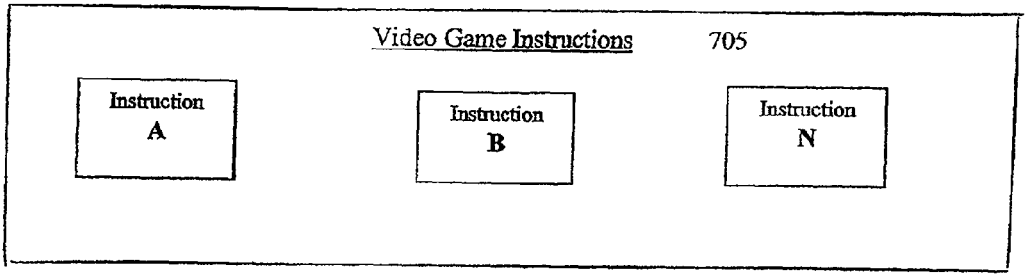

Image data and video game instructions can also be modified as illustrated in FIGS. 7C and 7D. For example, a shown in FIG. 7C weather imagery for location A 715A can be modified, video game character A appearance imagery 715B can be modified, and any imagery related to the appearance of Location A 715C can also be modified. Video game instructions can also be modified such that the manner in which the video game functions, or the manner in which the video game is played, can be modified as disclosed herein.

Figure 7E:
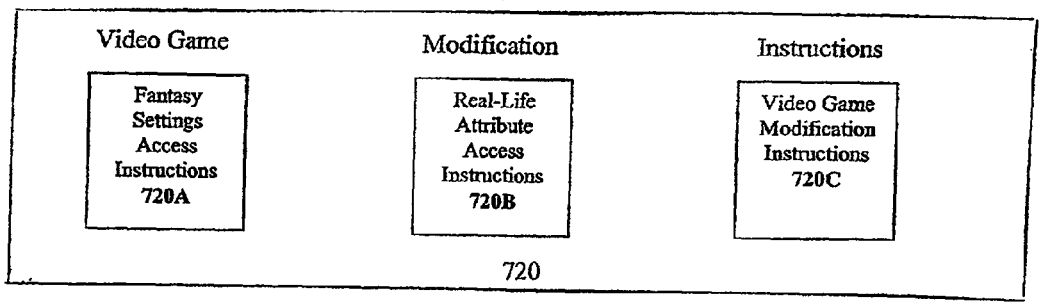

FIG. 7E illustrates an example of the types of video game modification instructions 720 that may be included in a video game product. For example, the video game modification instructions can include instructions for accessing fantasy settings 520A, instructions for accessing parameters associated with real-life attributes 720B, and instructions for modifying the video game based on the assessed parameters and fantasy settings 720C. The video game modification instructions can also include instructions for accessing advertising media and the virtual world or any of the other actions disclosed herein.

An online fantasy game and draft may be eliminated according to some embodiments. For example, the interface for fantasy players to select players, manage their roster, attend a draft and do any or all of the actions disclosed herein or in Appendix A may be conducted using a game console. For example, the player may logon using the game console and play traditional fantasy league play using a game console. The player may also play sports video games using the console as discussed herein using real-life attributes downloaded by the server which may also manage the fantasy league play through the console.

Embodiments within the scope of embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, several embodiments will be described in the general context of instructions, such as program modules, being executed by computer consoles, computers in network environments. Generally, program modules include routines, programs, objects, components, data structures, etc. that perform particular tasks or implement particular abstract data types. Instructions, associated data structures, and program modules represent examples of the program code means for executing steps of the methods disclosed herein. The particular sequence of such executable instructions or associated data structures represents examples of corresponding acts for implementing the functions described in such steps.

The embodiments illustrated herein may be practiced in network gaming and computing environments with many types of system configurations, including video game machines, such as consoles, personal computers, hand-held devices, multi-processor systems, microprocessor-based or programmable consumer electronics, network PCs, mini-computers, mainframe computers, and the like. Several embodiments may also be practiced in distributed gaming and computing environments where tasks are performed by local and remote processing devices that are linked (either by hardwired links, wireless links, or by a combination of hardwired or wireless links) through a communications network. In a distributed computing environment, program modules may be located in both local and remote memory storage devices, for example in reference to a video game machine.

VII. Process Examples According to the Teachings Disclosed Herein

While the following methods illustrate combinations of steps and/or acts according to the invention disclosed herein, such combinations are not considered limiting of the invention. Rather, any combination, permutation, and multiplicity of the acts and steps disclosed herein, or disclosed in U.S. Provisional Patent Application Ser. No. 60/869,831, should be considered within the scope of the invention disclosed herein. Therefore, while the following (and previous) combination of process elements illustrate some example embodiments of the novel and non-obvious aspects, they are not exhaustive of the teachings of the inventions disclosed herein.

Figure 8:
FIG. 8 illustrates a method for providing a sports video game that includes real-life attributes and fantasy settings and attributes.

Referring to FIG. 8, a method for providing a sports video game that includes real-life attributes and fantasy settings and attributes illustrated. A fantasy team owner registers with a fantasy league (800). The fantasy league can be an online fantasy league. The fantasy league registration can include setting up a league, establishing rules of the league, whether the league is private or public, as well as other fantasy player and league settings (e.g. see Appendix A of provisional application 60/869,831 and other known fantasy leagues).

A fantasy draft is performed (810). The fantasy draft can be performed by the fantasy team owner or the draft can be performed by an automated draft, for example as those examples described in Appendix A of the provisional application 60/869,831. The fantasy team owner can organize a draft list prior to the draft which can list the real-life athletes in an order selected by the fantasy team owner according to which an automatic draft is to be conducted.

A line-up is set (825). The fantasy team owner can set the line-up by selecting active fantasy team members and placing other fantasy team members on a bench, or as reserved. The lineup can include rules, such as requiring a number of forwards (e.g. 3), defense (e.g. 2), and a goalie (e.g. 1) in the example of a hockey fantasy league. Some of the various options for setting up a fantasy roster are illustrated by Appendix A of provisional application 60/869,831. The line-up and roster can be altered by the fantasy team owner by picking up available fantasy team members, trading fantasy team members, etc. The line-up also selects a match-up which can affect a parameter of the video game. For example, one real-life sports athlete may have a more difficult match up than another real-life sports athlete and a parameter of the video game can be affected, e.g. modified, based on the relative match ups of the real-life sports athletes based on their selection by the fantasy team owner managing the roster.

A user (e.g. the fantasy team owner) then plays a video game that has at least one parameter affected by at least one of the fantasy settings described herein (820). The video game played by the user can also have at least one parameter affected by a real-life attribute as described herein.

Figure 9:
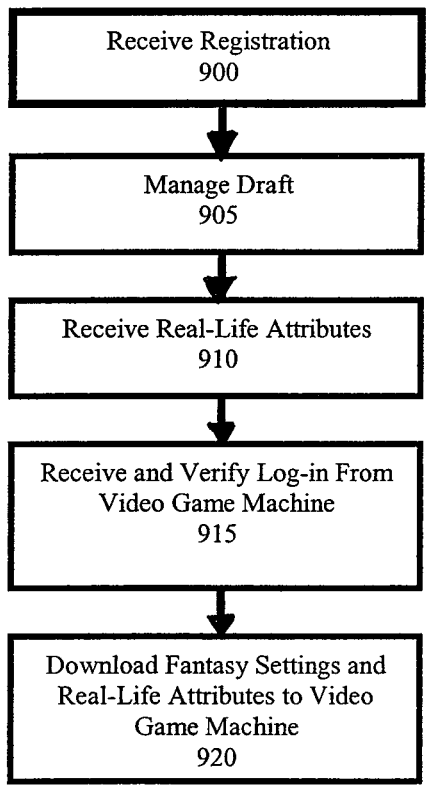
FIG. 9 illustrates a method for providing information describing fantasy settings and/or real-life attributes for affecting a parameter of a sports video game is illustrated.

Referring to FIG. 9, a method for a server (or multiple servers) to provide information describing fantasy settings and/or real-life attributes for affecting a parameter of a sports video game is illustrated. The server receives a registration from a fantasy team owner (900). The server can receive a username and login or other identification of the fantasy team owner. The server can generate league and fantasy team owner information describing default or customized fantasy settings. The server records the settings of the fantasy league and settings of the fantasy team owner along with settings of other fantasy team owners in the fantasy league.

The server manages a fantasy draft (905). The server can include an online draft as described in Appendix A of provisional application 60/869,831, for example. The server records results of the draft and sets up the various fantasy teams and online presentations for the fantasy team owners. The server can also provide other online presentations as illustrated in Appendix A of provisional application 60/869,831, for example. Such online presentations can include lists of available real-life athletes and presentations for trading fantasy team members and analysis of teams and fantasy team members. The server can also set up a statistics page that gives statistics of real-life athletes, standings of the fantasy league and information describing playoffs.

The server can also receive real-life attributes (910), such as real-life athletes and real-life team statistics. The real-life attributes can also include any real-life event or statistic that affects real-life athletes and real-life team performance, for example. The server stores information describing the fantasy settings for each fantasy team and the fantasy league. The server also stores the information describing real-life attributes. The information stored by the server includes any real-life or fantasy information that may affect performance of a real-life athlete or team in the future. For example, the information stored may be information that affects a real-life athlete's performance or team's performance, injuries, opposition, or other changes to a real-life athlete or team.

The server receives and verifies fantasy login information received from a video game machine (915). The server transfers stored information describing fantasy settings and/or real-life attributes to the video game machine (920). Information may also be received by the server from the video game machine describing changes made by the user (e.g. the fantasy team owner) to fantasy settings at the video game machine. For example, the user may change a lineup or roster setting at the video game machine and the settings can be synchronized between the server and the video game machine.

Figure 10:
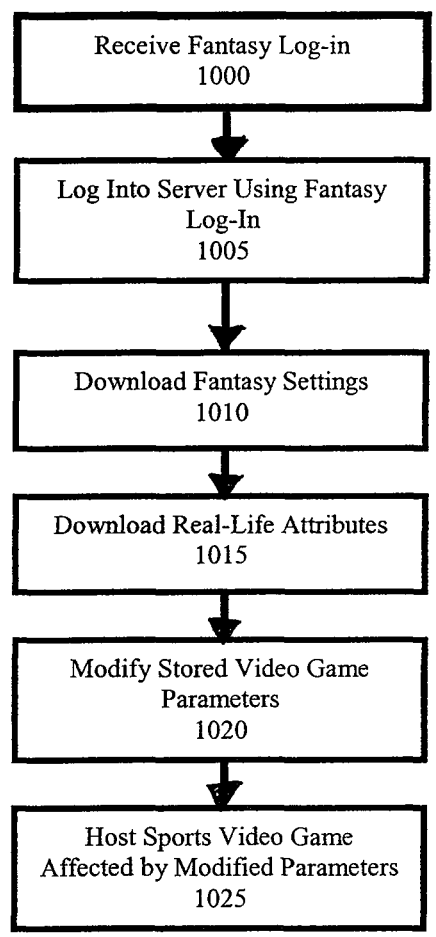
FIG. 10 illustrates a method for a video game machine, such as a game console, to provide a video game with parameters of the video game affected by real-life attributes and events as well as fantasy settings.

Referring to FIG. 10, a method is illustrated for a video game machine, such as a game console, to provide a video game with parameters of the video game affected by real-life attributes and events as well as fantasy settings. The video game machine can receive fantasy login information from the user (1000). The fantasy login information can include a user name and password associated with a fantasy team. The fantasy login information may also include information describing a fantasy league to which the user belongs. For example, the fantasy login information may indicate that the user is a member of a fantasy league hosted or associated with Yahoo, the NFL, the NBA, FIFA soccer, the NHL, college sports, etc. Registration of the user may also be automated where joining a fantasy league is combined with purchase of a gaming console, sports video game, or on some other basis.

Using the fantasy login information, the video game machine logs into a server (or multiple servers) (1005) over a network, such as the Internet, and downloads information describing fantasy settings, such as information describing or related to roster, lineup, match-up, events, teams, fantasy team members, or any other fantasy related information (1010), such as any of the fantasy related information described in Appendix A of provisional application 60/869,831. The game machine also downloads real-life attributes describing real-life athletes and/or teams and/or matchups, etc. (1015).

The video game machine can modify (e.g. add, change, delete) stored information based on the information downloaded (1020). For example, stored video game parameters, such as video game character performance parameters may be modified based on the information downloaded. For example, video game character in the video game may have better (or worse) speed, agility, catching, scoring, passing, hitting, checking, saving abilities, or other abilities affected by the parameters affected by the downloaded information. The video game machine provides sports video game play affected by the fantasy and real-life attribute information downloaded (1025).

Figure 11:
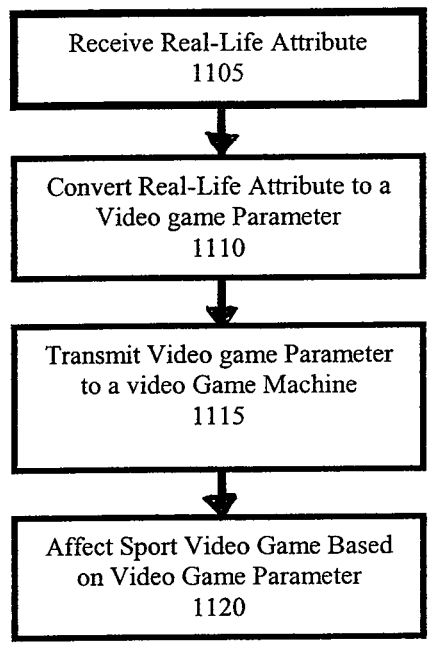
FIG. 11 illustrates a method for updating a sports video game with video game parameters representing real-life attributes.

Referring to FIG. 11 a method for updating a sports video game with video game parameters representing real-life attributes is illustrated. The method includes receiving a real life environmental attribute (1105). The real life attribute can include a weather attribute at a particular real-life location.

The real-life environmental attribute is converted to one or more video game parameters (1110). For example, a real-life weather attribute can be converted in to a video game weather parameter. The video game weather parameter can include weather imagery and/or instructions for simulating in the video game the real life weather attribute at a location in the video game representing the real-life location such that the virtual video game location more closely represents the real life location.

The method further includes transmitting the video game environmental parameter to a video game machine (1115) via a network such that the video game environmental parameter affects the sports video game (1120). Therefore, video game parameters of the video game being played by the video game machine more closely resemble real-life attributes as the video game parameters sent to the video game machine are configured to update the video game according to real-life attributes. The video game parameters can be sent to any number of video game machines via the internet so that each video game machine logged into the server and having a certified copy of the video game is able to receive periodic, real-time, or initiated updates to the video game.

The methods disclosed herein can further include any other act disclosed herein. For example, the methods disclosed herein can include hosting an online fantasy sports league. The methods can further include transmitting a fantasy team roster to the video game machine via a network. The methods can further include receiving a sport attribute for a particular real-life athlete. The methods can further include converting the sports attribute to a video game performance parameter. The methods can further include transmitting the video game performance parameter to the video game machine, wherein when the video game performance parameter is incorporated into the sports video game such that a particular video game character more closely performs like the real-life athlete.

The environmental attribute can include a fan attribute. The methods can further include receiving a fan attribute for a real-life fan or group of real-life fans. The methods can further include converting the fan attribute to a video game fan parameter. The methods can further include transmitting the video game fan parameter to the one or more video game machines, wherein then the video game fan parameter is incorporated into the sports video game a video game fan or group of video game fans are modified to more closely resemble or act like the real-life fan or real-life group of fans. The real-life fan or real-life fans can be associated with a particular real-life sports team.

The methods can further include receiving advertisement image data. The methods can further include transmitting the advertisement image data to the video game machine based on a geographic location of the video game machine. The methods can further include tracking the actions of a motional avatar to selection advertisement media for display in a video game or in a virtual world.

The methods can further include hosting a virtual world in which video game users create personal motional avatars and navigate the virtual world. The personal motional avatars can be capable of walking, running, and/or flying to navigate the virtual world and are able to interact with other personal motional avatars. The methods can further include modifying a weather parameter of a virtual location in the virtual world based on the real-life environmental attribute. The virtual location can represent the particular real-life location. The methods can further include converting real-world currency to virtual currency. The virtual currency can be used as tender in the virtual world. The methods can further include awarding virtual currency, or a virtual trophy, to a user of a particular personal motional avatar based on a result of a video game completion and/or a result of an online fantasy sports league competition. The methods can further include enabling a user to create features or modify landscape in the virtual world. The methods can further include enabling a user to create features or modify landscape in the video game. The methods can further include displaying sports video depicting a real-life sport event, real-life sport commentary, and/or real life sport reporting in the virtual world. The methods can further include displaying results describing a real life sports event, a video game competition, and/or an online fantasy sport league competition in the fantasy world. The methods can further include selling virtual land in the virtual world for the virtual currency. The methods can further include enabling personal motional avatars to wager in the virtual world on a video game competition, online fantasy sport league competition, and/or a real-life sport competition.

Figure 12:
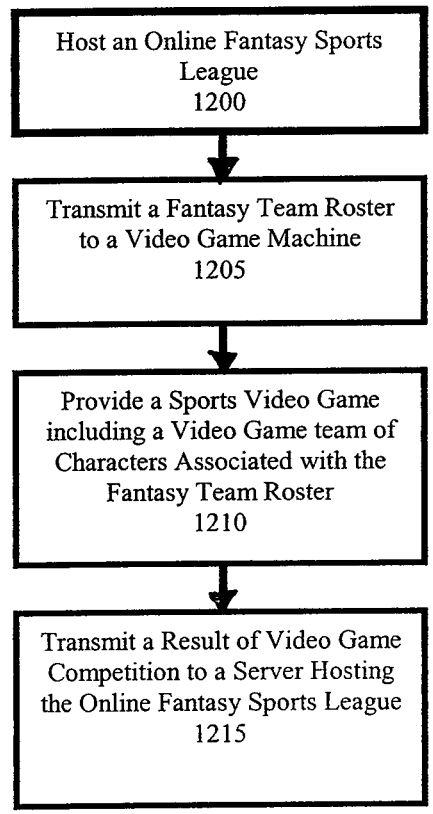
FIG. 12 illustrates a method for updating a sports video game with one or more fantasy settings.

Referring to FIG. 12, a method for updating a sports video game with one or more fantasy settings is disclosed. The method includes hosting an online fantasy sports league (1200). The act of hosting an online fantasy sports league can further include hosting a fantasy draft where players for a plurality of fantasy teams are selected. The fantasy draft order can be determined by consideration of the video game competition result. The act of hosting an online fantasy sports league can further include compiling fantasy competition scores for the fantasy season. The act of hosting an online fantasy sports league can further include receiving trade selections between two fantasy teams which select players to trade between the teams. The act of hosting an online fantasy sports league can further include enabling fantasy team owners to pick up players from a waiver list and drop players from their fantasy roster. The act of hosting an online fantasy sports league can further include enabling fantasy team owners to vary the active and reserve players on their fantasy team.

The method further includes transmitting a fantasy team roster to a video game machine via a network (1205). The fantasy team roster can include a list of real-world athletes associated with video game characters of a sports video game played using the video game machine.

The method can further include analyzing a fantasy draft as the fantasy draft is conducted and identifying one or more available players in the fantasy draft for suggested selection. The method can further include transmitting information describing the identified players for suggested selection to the video game machine. The fantasy draft analysis can include analyzing historical performance of available players, a scoring format of the fantasy league, and/or a bye week for available players. The method can further include transmitting a current fantasy team roster to a video game machine. The method can further include evaluating an upcoming match-up for a real-life athlete. The method can further include predicting a performance attribute for the real-life athlete's performance in the upcoming match-up. The method can further include converting the performance attribute to a video game performance parameter. The method can further include transmitting the video game performance parameter to the video game machine to modify a performance of a video game character associated with the real-life athlete according to the video game performance parameter. The method can further include receiving feedback from fantasy team owners regarding the predicted performance attribute. The method can further include modifying the predicted performance attribute. The method can further include converting the modified performance attribute to a modified video game performance parameter. The method can further include transmitting the modified video game performance parameter to the video game machine to modify the performance of the video game character associated with the real-life athlete according to the modified video game performance parameter. The method can further include receiving additional video game competition results. The method can further include calculating a combined online fantasy sports score and video game competition score from the additional video game competition results and fantasy competition results.

The method further includes providing a sports video game including a video game team of characters associated with the fantasy team roster (1210). The method further includes transmitting a result of video game competition to a server hosting the online fantasy sports league (1215).

Figure 13:
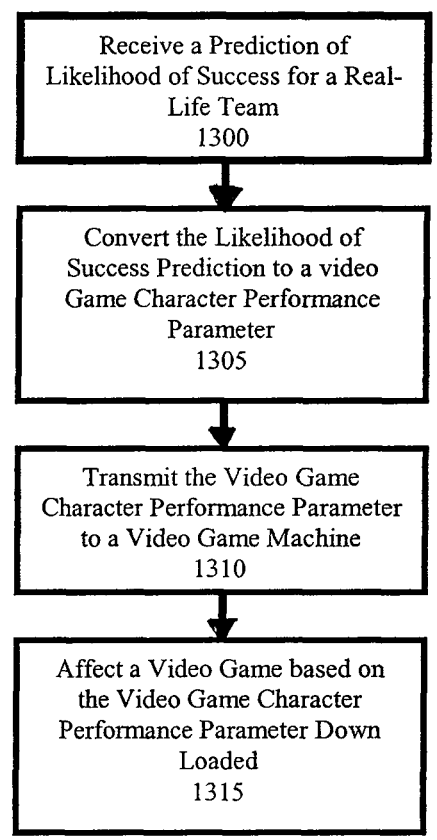
FIG. 13 illustrates a method for updating parameters of a sports video game with one or more predictive real-life athlete attributes.

Referring to FIG. 13, a method for updating parameters of a sports video game with one or more predictive real-life athlete attributes is disclosed. The method includes analyzing an upcoming athletic event for a particular athlete or for a particular team of athletes to predict a likelihood of success for the particular athlete or the particular team of athletes (1300). The method further includes converting the likelihood of success prediction to a video game character performance parameter (1305). The method further includes downloading the video game character performance parameter to a video game machine (1310) affecting the video game character performance parameter into the sports video game (1315). The method can further include any act or step disclosed herein. For example, the method can further include any act or step related to updating a sports video game with real-life attributes, updating a sports video game with fantasy settings, associating a sports video game with a virtual world, allowing users to control changes to a sports video game, and/or incorporating advertisements into a sports video game and/or a the virtual world as disclosed herein.

Figure 14:
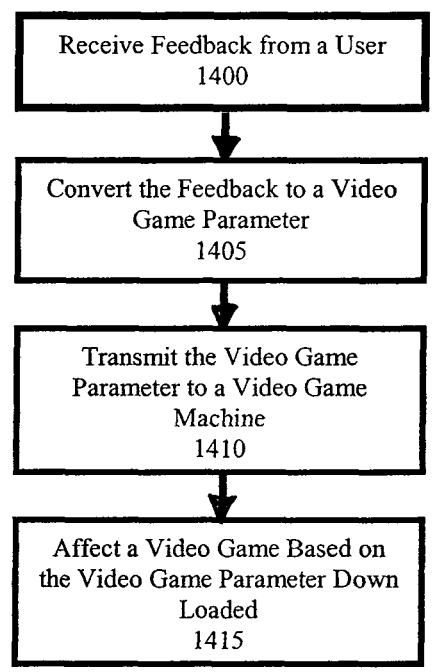
FIG. 14 illustrates a method for modifying a video game.

Referring to FIG. 14, a method for modifying a video game is illustrated. The method includes receiving feedback from a user of the video game (1400). The method further include converting the feedback to a video game parameter (1405). The method further includes transmitting the video game parameter to a video game machine (1410). The method further includes affecting a video game based on the video game parameter downloaded (1415).

Figure 15:
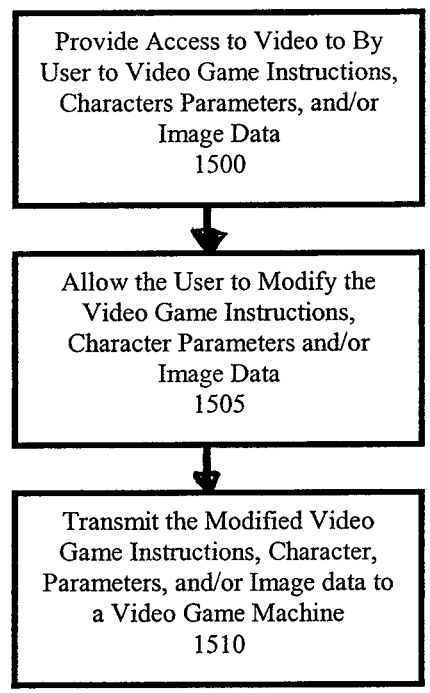
FIG. 15 illustrates a method for modifying a video game.

Referring to FIG. 15, a method for modifying a video game is illustrated. The method includes providing access for a user of a video game to one or more of the video game instructions, character parameters, and/or video game image data (1500). The method further includes allowing the user to modify the video game instructions, character parameters, and/or image data (1505). The method further includes transmitting the modified video game instructions, character parameters and/or image data to one or more video game machines via a network including the Internet (1510).

Figure 16:
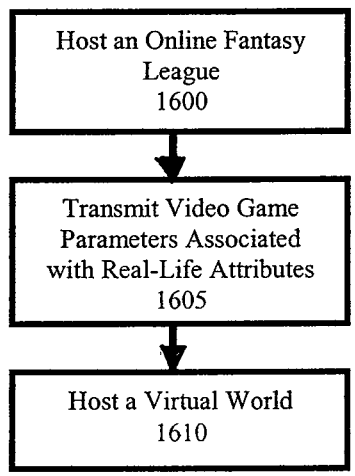
FIG. 16 illustrates a method for providing a virtual world in conjunction with an online fantasy sports league and/or a video game.

Referring to FIG. 16, a method for providing a virtual world in conjunction with an online fantasy sports league and/or a video game is illustrated. The method includes hosting an online fantasy sports league (1600). The method further includes transmitting video game parameters associated with real-life attributes to the video game machine (1605). The method further includes hosting a virtual world where users navigate the virtual world vial personal motional avatars and interact with other users via their motional personal avatars (1610).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded.

We claim:

1. A video game program product comprising computer executable software instructions stored on non-transitory tangible storage device for use in conjunction with a video game machine the computer-executable software instructions comprising:

sports video game instructions, sports video game character parameters, and image data configured to provide a sports video game associated with a real-life collegiate or professional sport in conjunction with the video game machine, the image data including character imagery representing a corresponding real-life athlete in the video game;

fantasy login instructions configured to cause the video game machine to perform the following:
  receive login information from a fantasy team owner via a controller in communication with the video game machine;
  transmit the login information to a server over a network that includes the Internet to verify the login information is associated with a particular fantasy sport league to which the fantasy team owner is a member; and
  receive confirmation information from the server that the login information is associated with the particular fantasy sport league; and fantasy draft instructions configured to cause the video game machine to perform the following:
  provide a video game machine platform for the fantasy team owner to attend a fantasy draft, wherein attending the fantasy draft includes selecting available real-life athletes from a list of available real-life athletes in the fantasy draft as members of a video game fantasy team roster and receiving information describing fantasy draft selections by other fantasy team owners attending the fantasy draft, wherein the fantasy draft is part of an online fantasy league where real-life statistics associated with real-life athletes are used to calculate fantasy points in the fantasy league;
  accessing and displaying the character imagery from the video game in the fantasy draft, the character imagery from the video game also representing the corresponding real-life athlete in the fantasy draft;
  transmit selection information to the server over the network that includes the Internet, the selection information identifying fantasy draft selections of available real-life athletes by the fantasy team owner; and
  receive selection information from the server over the network that includes the Internet identifying fantasy draft selections made by other fantasy team owners.

2. A video game program product according to claim 1, wherein the sports video game is a football sports video game, the sports video game instructions being configured to receive video game control input from a video game controller operated by the fantasy team owner and communicably coupled to the video game machine, wherein the video game control input includes control of video game characters and selection of football plays, wherein control of the video game characters includes control of a quarterback video game character and control of a football receiver video game character.

3. A video game program product according to claim 1, wherein the sports video game is a soccer sports video game, the sports video game instructions being configured to receive video game control input from a video game controller operated by the fantasy team owner and communicably coupled to the video game machine, wherein the video game control input includes control of video game characters and selection of soccer plays.

4. A video game program product according to claim 1, wherein the sports video game is a basketball sports video game, the sports video game instructions being configured to receive video game control input from a video game controller operated by the fantasy team owner and communicably coupled to the video game machine, wherein the video game control input includes control of video game characters and selection of basketball plays.

5. A video game program product according to claim 1, wherein the fantasy draft instructions are further configured to cause statistics associated with a particular real-life athlete to be displayed by the video game machine along with the virtual character imagery representing the particular real-life athlete prior to selection by the fantasy team owner so that the fantasy team owner can assess whether to select the particular real-life athlete as a member of the fantasy team owner's fantasy team.

6. A video game program product according to claim 1, wherein the fantasy draft instructions are further configured to associate a virtual athlete representing a real-life athlete with a virtual jersey associated with the fantasy team owner's fantasy team.

7. A video game program product according to claim 1, wherein:
  a fantasy team roster selected in the fantasy draft includes a list of active status fantasy team members and a list of inactive status fantasy team members;
  a video game team includes a list of active video game characters and non-active video game characters consistent with the fantasy team roster;
  the video game program product further comprising:
  fantasy league instructions enabling a user to change the status of a particular fantasy team member or a particular video game character from active to inactive or from inactive to active using the video game machine; and
  fantasy league instructions configured to synchronize the changed status stored at the server with the changed status of the particular fantasy team member made at the video game machine.

8. A video game machine, comprising:
  one or more processors; and
  one or more non-transitory storage devices including the videogame program product according to claim 1.

9. A video game machine according to claim 1, comprising:
  one or more non-transitory storage devices including the videogame program product according to claim 1;
  a cell broadband engine CPU;
  a RSX GPU;
  256 MB XDR main RAM 256 GDDR3 VRAM;
  a 2.5" serial ATA 60 GB HDD;
  USB connections;
  an IEEE 802.11b/g WiFi connection;
  a Bluetooth connection; and
  a wireless Bluetooth controller connection.

10. A video game program product according to claim 1, wherein the video game program product is in the form of a RAM, ROM, optically readable non-transitory tangible medium, or magnetically stored non-transitory tangible medium.

11. A video game program product according to claim 1, wherein the fantasy draft instructions enable the fantasy team owner to set up a draft queue using the video game machine, the draft queue includes a list of real-life athletes that is used to make a selection from the list of available real-life athletes in the draft if the fantasy draft owner does not select an available real-life athlete during an allotted time.

12. A video game program product according to claim 1, wherein the fantasy draft instructions include chat instructions enabling a user to send text, image, and/or audio chat information to other fantasy team owners during the draft using the video game machine.

13. A video game program product according to claim 1, wherein the fantasy draft instructions are further configured to cause the video game machine to download a fantasy draft setting, the fantasy draft setting defining a manner in which the fantasy draft is conducted by the video game machine.

14. A video game program product according to claim 13, wherein the fantasy draft setting includes a maximum number of players per fantasy team and a maximum number of fantasy team members of a particular sport position, wherein the fantasy draft setting is received from the server.

15. A video game program product according to claim 1, wherein the fantasy draft instructions further include instructions configured to determine a draft order based on a result of video game competition between at least two fantasy team owners.

16. A video game program product according to claim 1, wherein the fantasy draft instructions further include instructions configured to cause the video game machine to download suggestion information describing one or more of the available real-life unselected athletes in the fantasy draft identified by the server as suggestions for selection.

17. A method performed by a video game machine, the method comprising:
the video game machine accessing sports video game instructions, sports video game character parameters, and image data configured to provide a sports video game associated with a real-life collegiate or professional sport in conjunction with the video game machine, the image data including character imagery representing a corresponding real-life athlete in the video game;
the video game machine receiving login information from a fantasy team owner via a controller in communication with the video game machine;
the video game machine transmitting the login information to a server over a network that includes the Internet to verify the login information is associated with a particular fantasy sport league to which the fantasy team owner is a member; and
the video game machine receiving confirmation information from the server that the login information is associated with the particular fantasy sport league;
the video game machine providing a platform for the fantasy team owner to attend the fantasy draft, wherein attending the fantasy draft includes selecting available real-life athletes from a list of available real-life athletes in the fantasy draft as members of a video game fantasy team roster and receiving information describing fantasy draft selections by other fantasy team owners attending the fantasy draft;
the video game machine storing character imagery representing the corresponding real-life athlete in the fantasy draft, and the fantasy draft instructions are further configured to cause the virtual character to be displayed in conjunction with the fantasy draft and while playing the video game on the video game machine;
the video game machine transmitting selection information to the server over the network that includes the Internet, the selection information identifying fantasy draft selections of available real-life athletes by the fantasy team owner;
the video game machine receiving selection information from the server over the network that includes the Internet identifying fantasy draft selections made by other fantasy team owners;
the video game machine updating a video game roster of video game characters at least weekly corresponding to a change in a fantasy roster made using the video game machine during the fantasy draft; and
the video game machine updating the video game roster of the video game characters in the video game at least weekly corresponding to a change in real-life sports competition of the real-life athletes.

18. A method according to claim 17, further comprising the video game machine receiving an update to a performance parameter of a video game character based on a change in fantasy value of that player in an upcoming real-life athletic event.

19. A method according to claim 17, wherein the update in the performance parameter of the video game character based on a change in fantasy value of that player in the upcoming real-life athletic event is based on input received from outside the fantasy league of the fantasy draft.

20. A method according to claim 17, wherein the video game machine updating a video game roster of video game characters at least weekly corresponding to a change in a fantasy roster made using the video game machine during the fantasy draft includes a change by a fantasy team owner associated with the fantasy video game team lineup includes a change from an inactive status to an active status of a player on the fantasy team owner's fantasy roster.

21. A method according to claim 17, wherein each fantasy team owner of the fantasy draft has their own video game team representing their fantasy team in the video game according to their fantasy team roster, and wherein upon finalization of the fantasy team lineup a corresponding video game team roster is set by the video game machine.

22. A method performed by a video game machine:
accessing sports video game instructions, sports video game character parameters, and image data configured to provide a sports video game associated with a real-life collegiate or professional sport in conjunction with the video game machine;
receiving login information from a fantasy team owner via a controller in communication with the video game machine;
transmitting the login information to a server over a network that includes the Internet to verify the login information is associated with a particular fantasy sport league to which the fantasy team owner is a member; and
receiving confirmation information from the server that the login information is associated with the particular fantasy sport league;
providing a platform for the fantasy team owner to attend the fantasy draft, wherein attending the fantasy draft includes selecting available real-life athletes from a list of available real-life athletes in the fantasy draft as members of a video game fantasy team roster and receiving information describing fantasy draft selections by other fantasy team owners attending the fantasy draft;
transmitting selection information to the server over the network that includes the Internet, the selection information identifying fantasy draft selections of available real-life athletes by the fantasy team owner;
receiving selection information from the server over the network that includes the Internet identifying fantasy draft selections made by other fantasy team owners; and wherein each fantasy team owner of the fantasy draft has their own video game team representing their fantasy team in the video game according to their fantasy team roster, and wherein changes made to each fantasy team roster of the fantasy league are updated by the video game machine in the video game team rosters of the video game and according to real-life events of real-life athletes represented by the video game characters in the video game.

* * * * *